United States Patent
Martin

(10) Patent No.: US 11,339,728 B1
(45) Date of Patent: May 24, 2022

(54) METHODS AND SYSTEMS FOR ENGINE BRAKING WITH REDUCED NOISE, VIBRATION, AND HARSHNESS

(71) Applicant: Ford Global Technologies, LLC, Dearborn, MI (US)

(72) Inventor: Douglas Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/115,546

(22) Filed: Dec. 8, 2020

(51) Int. Cl.
| | |
|---|---|
| *F02D 13/04* | (2006.01) |
| *F02D 13/06* | (2006.01) |
| *F02D 13/02* | (2006.01) |
| *F02D 41/00* | (2006.01) |
| *F02D 41/40* | (2006.01) |
| *F02B 37/22* | (2006.01) |
| *B60W 10/198* | (2012.01) |
| *B60W 10/06* | (2006.01) |
| *F02B 37/24* | (2006.01) |

(52) U.S. Cl.
CPC ........... *F02D 13/04* (2013.01); *B60W 10/198* (2013.01); *F02B 37/22* (2013.01); *F02D 13/0207* (2013.01); *F02D 13/06* (2013.01); *F02D 41/0005* (2013.01); *F02D 41/0007* (2013.01); *F02D 41/0087* (2013.01); *F02D 41/405* (2013.01); *B60W 10/06* (2013.01); *F02B 37/24* (2013.01); *F02D 2041/0012* (2013.01)

(58) Field of Classification Search
CPC .. F02D 13/04; F02D 41/0007; F02D 41/0087; F02D 41/405; F02D 13/0207; F02D 41/0005; F02D 13/06; F02D 2041/0012; F02B 37/22; F02B 37/24; B60W 10/198; B60W 10/04; B60W 10/06
USPC ............. 701/101; 123/323, 345–346; 60/602
See application file for complete search history.

(56) References Cited

U.S. PATENT DOCUMENTS

| | | | | |
|---|---|---|---|---|
| 5,733,219 A | * | 3/1998 | Rettig | F02D 13/04 123/322 |
| 5,921,883 A | * | 7/1999 | Bellinger | F02D 13/04 477/33 |
| 6,062,025 A | * | 5/2000 | Okada | F02B 37/24 60/602 |
| 6,085,526 A | * | 7/2000 | Bischoff | F02D 41/0005 60/602 |

(Continued)

FOREIGN PATENT DOCUMENTS

| | | |
|---|---|---|
| GB | 2572583 A | 10/2019 |
| WO | 2017127219 A1 | 7/2017 |

*Primary Examiner* — Sizo B Vilakazi
*Assistant Examiner* — Brian R Kirby
(74) *Attorney, Agent, or Firm* — Geoffrey Brumbaugh; McCoy Russell LLP

(57) ABSTRACT

Methods and systems are provided for engine braking in a vehicle. In one example, a method may include, in response to an engine braking request: deactivating fueling to at least one engine cylinder, decreasing an effective flow area of a turbine inlet of a variable geometry turbocharger (VGT), and adjusting an intake valve of the at least one engine cylinder based on a requested braking torque of the engine braking request and the effective flow area of the turbine inlet. In this way, increased exhaust backpressure may be generated to increase engine pumping losses while the intake valve adjustment increases in-cylinder pumping losses, thereby increasing an amount of engine braking torque.

19 Claims, 9 Drawing Sheets

(56) References Cited

U.S. PATENT DOCUMENTS

| | | | | |
|---|---|---|---|---|
| 6,148,793 A * | 11/2000 | Faletti | F01L 13/06 | 123/322 |
| 6,155,217 A * | 12/2000 | Shiraishi | F02D 13/0207 | 123/90.15 |
| 6,497,097 B2 * | 12/2002 | Schmidt | F02D 9/06 | 60/602 |
| 6,625,986 B2 * | 9/2003 | Mazaud | F01L 1/34 | 60/602 |
| 6,652,414 B1 * | 11/2003 | Banks, III | F16H 61/21 | 477/32 |
| 6,705,282 B2 * | 3/2004 | Hlavac | F02D 13/04 | 123/322 |
| 6,779,506 B1 * | 8/2004 | Beaucaire | F02D 41/12 | 123/321 |
| 7,308,886 B2 * | 12/2007 | Balles | F02D 41/0005 | 123/321 |
| 7,412,963 B2 * | 8/2008 | Schmid | F01L 13/06 | 123/320 |
| 8,478,505 B2 | 7/2013 | Swartling et al. | | |
| 8,738,248 B2 * | 5/2014 | Andrasko | F02D 9/06 | 701/54 |
| 9,546,592 B2 * | 1/2017 | Lingens | F02B 37/22 | |
| 2003/0014973 A1 * | 1/2003 | Mazaud | F02D 13/04 | 60/602 |
| 2004/0187842 A1 * | 9/2004 | Yang | F02D 13/04 | 123/322 |
| 2006/0037578 A1 * | 2/2006 | Nakamura | F01L 13/0005 | 123/198 F |
| 2007/0137615 A1 * | 6/2007 | Benz | F01L 13/06 | 123/321 |
| 2008/0059031 A1 * | 3/2008 | Yasui | F02D 15/04 | 701/51 |
| 2008/0133108 A1 * | 6/2008 | Kojima | F02D 35/023 | 701/102 |
| 2008/0307771 A1 * | 12/2008 | Barton | F02D 41/0245 | 60/274 |
| 2009/0193790 A1 * | 8/2009 | Richter | F02D 41/025 | 60/274 |
| 2010/0037856 A1 * | 2/2010 | Dickerson | F02M 26/71 | 123/323 |
| 2010/0258080 A1 * | 10/2010 | Andrasko | F02D 9/06 | 123/323 |
| 2011/0100324 A1 * | 5/2011 | Xin | F02D 13/04 | 123/322 |
| 2012/0017868 A1 * | 1/2012 | Rammer | F02D 41/1448 | 123/323 |
| 2014/0214308 A1 * | 7/2014 | Mulloy | F02D 13/04 | 701/110 |
| 2014/0358400 A1 * | 12/2014 | Whitney | B60W 30/18136 | 701/102 |
| 2015/0040859 A1 * | 2/2015 | Scavone | F02D 41/0007 | 123/323 |
| 2015/0107553 A1 * | 4/2015 | Bartkowicz | F02B 37/162 | 123/323 |
| 2015/0240708 A1 * | 8/2015 | Kostrzewski | F02D 41/0065 | 60/601 |
| 2016/0290196 A1 * | 10/2016 | Cassani | F01N 13/009 | |
| 2018/0274456 A1 * | 9/2018 | Gunnarsson | F01L 13/06 | |
| 2019/0040802 A1 * | 2/2019 | Lilly | F02D 13/0276 | |
| 2020/0011257 A1 * | 1/2020 | Stretch | F02D 41/0255 | |
| 2020/0156613 A1 * | 5/2020 | Cecil | F02D 13/04 | |

\* cited by examiner

METHODS AND SYSTEMS FOR ENGINE BRAKING WITH REDUCED NOISE, VIBRATION, AND HARSHNESS

FIELD

The present description relates generally to methods and systems for engine braking in a vehicle.

BACKGROUND/SUMMARY

In diesel-powered and lean burning boosted gasoline-powered vehicles, a desired rate of slowing down an engine responsive to releasing an accelerator pedal may not be available via restriction to air flow due to unthrottled air flow to the engine. Without additional assistance, slowing of the engine may rely on mechanical brakes, rendering the mechanical brakes prone to overheating and subject to frequent usage, thereby accelerating degradation of the mechanical brakes.

Slowing of the diesel engine may be assisted via various engine braking mechanisms. As one example, decompression (e.g., compression release) engine braking may include opening cylinder exhaust valves before a compression stroke ends, thereby releasing compressed gas from within the cylinder and reducing an amount of "air spring" force available to push down a piston of the cylinder. As a result, the engine will use additional energy to pull the piston back down. However, the sudden release of the compressed gas creates noise that may be unacceptable to vehicle occupants.

Other attempts to address engine braking include systems and methods to increase pumping losses. One example approach is shown by Stretch et al. in WO2017/127219 A1. Therein, a variable geometry turbocharger (VGT) is used to control an intake or exhaust flow rate or back pressure in the exhaust.

However, the inventors herein have recognized potential issues with such systems. As one example, increasing exhaust backpressure alone via the VGT may not be as effective as decompression braking. As another example, the inventors herein have advantageously recognized that a VGT may be used in combination with other engine braking techniques to synergistically provide effective engine braking with reduced noise compared to decompression braking alone.

In one example, the issues described above may be addressed by a method, comprising: responsive to an engine braking request: deactivating fueling to at least one cylinder of an engine; decreasing an effective flow area of a turbine inlet of a variable geometry turbocharger (VGT); and adjusting an intake valve of the at least one cylinder based on a requested braking torque of the engine braking request and the effective flow area of the turbine inlet. In this way, increased exhaust backpressure may be generated to increase engine pumping losses while the intake valve adjustment increases in-cylinder pumping losses, thereby providing the requested braking torque.

As one example, the intake valve may be adjusted via a continuously variable valve lift (CVVL) mechanism. For example, the CVVL mechanism may be used to further close the intake valve of the at least one cylinder, such as by further decreasing a hydraulic pressure in the CVVL mechanism that is applied to the intake valve as the requested braking torque of the engine braking request increases. In some examples, the method may include determining an amount of braking torque produced via exhaust backpressure that is generated by decreasing the effective flow area of the turbine inlet and then determining a further closed position for the intake valve based on a difference between the amount of braking torque produced via the exhaust backpressure and the requested braking torque. For example, the intake valve may be closed to a further degree as the difference increases. As another example, an exhaust valve of the at least one cylinder may be adjusted in addition to the intake valve. For example, an opening timing of the exhaust valve may be adjusted to occur within a threshold number of crank angle degrees before top dead center. Further, the opening timing may occur before top dead center of the exhaust stroke, before top dead center of the compression stroke, or before top dead center of both the exhaust stroke and the compression stroke to release compressed gas from the at least one cylinder. Further still, when a throttle valve is present, the method may include at least partially closing the throttle valve to further increase engine pumping losses and generate braking torque.

By further closing the intake valve in combination with generating the exhaust backpressure via the VGT while at least one cylinder is unfueled, effective engine braking may be provided with reduced noise compared with traditional decompression braking. For example, engine pumping losses generated via the increased exhaust backpressure may have a synergistic effect with the increased in-cylinder pumping losses generated by adjusting the intake and/or exhaust valve to create an engine braking torque that is greater than either source of braking torque on its own. As a result, the engine braking may effectively slow the engine without engaging (or with reduced engagement of) mechanical brakes and with reduced braking noise. In this way, wear on the mechanical brakes may be decreased, thereby reducing a frequency of mechanical brake replacement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for engine braking of an engine. The engine may be the engine schematically shown in FIG. 1 that includes a variable geometry turbocharger (VGT), an example of which is detailed in FIG. 2. Further, intake and exhaust valves of the engine may be each controlled via a continuously variable valve lift (CVVL) system, such as the example CVVL system shown in FIG. 3. The VGT and the CVVL system may be used synergistically to provide engine braking, such as according to the example method of FIG. 4. As an example, the intake and/or exhaust valve settings may be differently adjusted via the CVVL system when combustion is requested compared to when engine braking is requested, as shown in the example timing charts of FIGS. 5-8, in order to increase in-cylinder pumping losses, while the VGT may be adjusted to increase exhaust backpressure for increased engine pumping losses. An example timeline for adjusting the VGT and the CVVL system when engine braking is requested is shown in FIG. 9.

Figure 1:
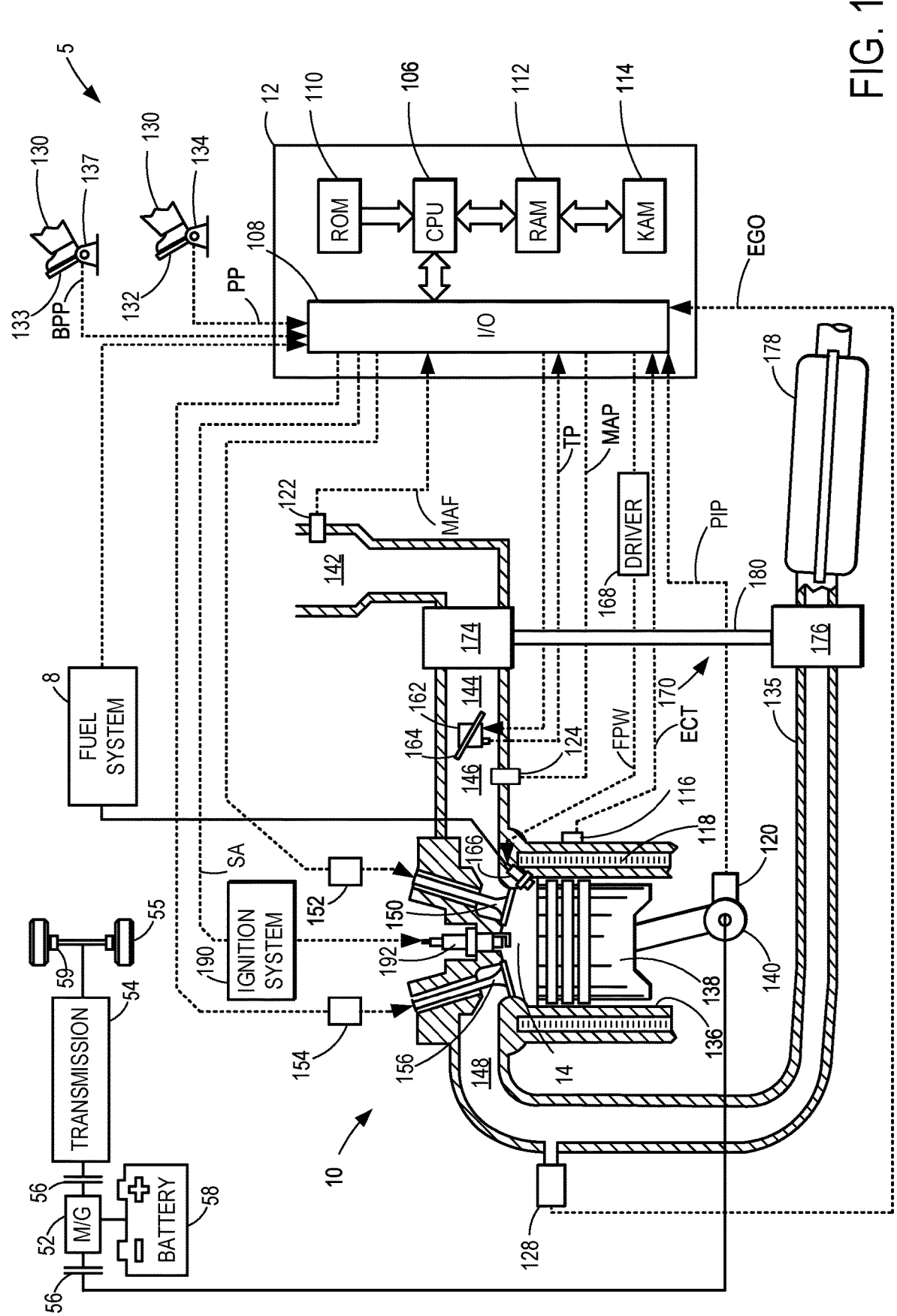
FIG. 1 schematically depicts an example cylinder of an internal combustion engine.
Figure 2:
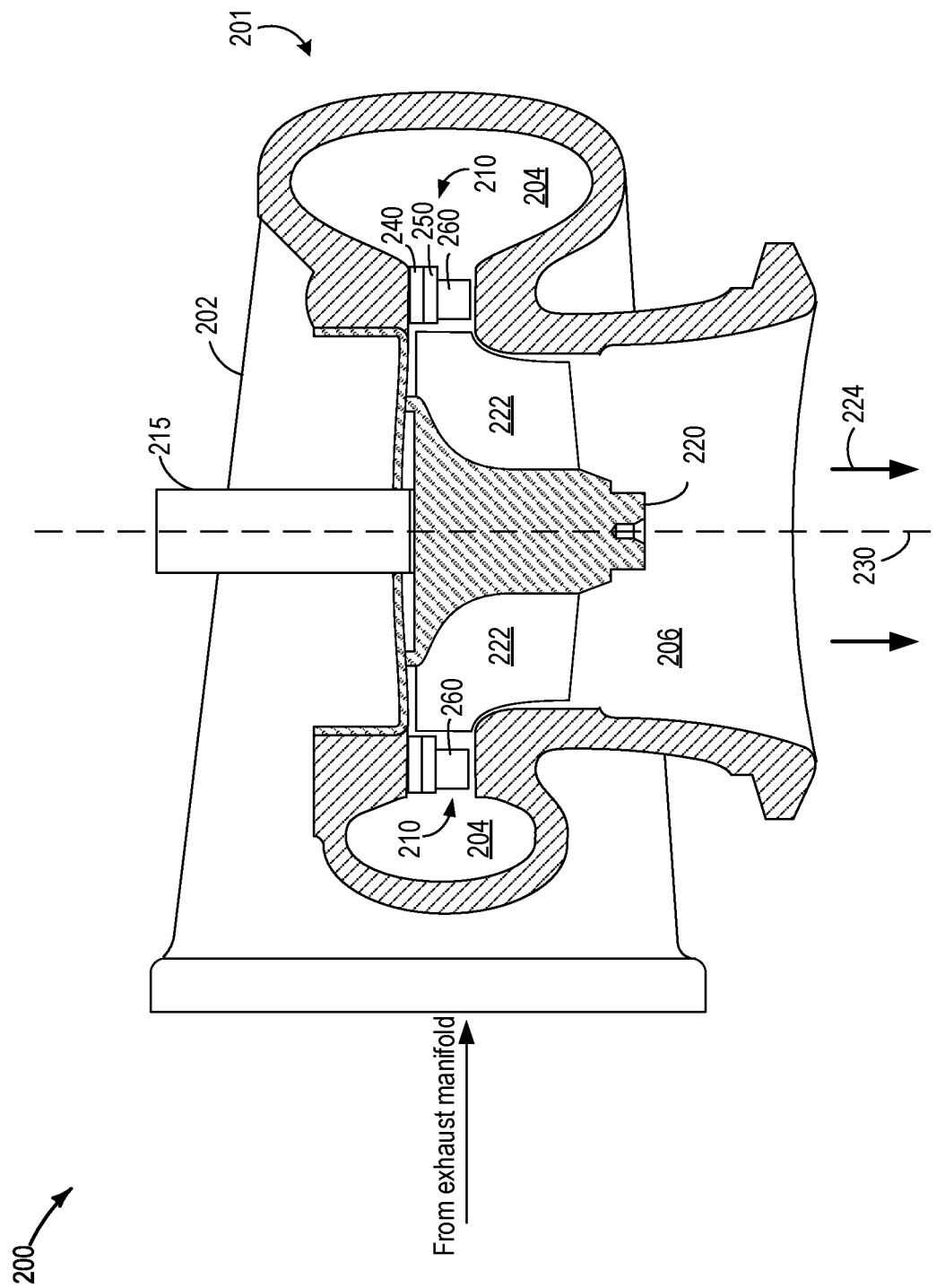
FIG. 2 shows a cross-sectional view of an example variable geometry turbocharger (VGT) turbine.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an accelerator pedal 132 and an accelerator pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include mechanical brakes 59 to slow the rotation of vehicle wheels 55. Mechanical brakes 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 5. As an example, mechanical brakes 59 may include a hydraulic brake system comprising brake calipers, a brake servo, and brake lines configured to carry brake fluid between the brake servo and the brake calipers. Mechanical brakes 59 may be configured such that a braking torque applied to wheels 55 by the brake system varies according to the pressure of brake fluid within the system, such as within the brake lines. Furthermore, vehicle operator 130 may depress a brake pedal 133 to control an amount of braking torque supplied by mechanical brakes 59, such as by controlling the pressure of brake fluid within the brake lines, to slow vehicle 5 and/or hold vehicle 5 stationary. For example, a brake pedal position sensor 137 may generate a proportional brake pedal position signal BPP, which may be used to determine the amount of braking torque requested by vehicle operator 130. Further, as will be elaborated herein, mechanical brakes 59 may be used in combination with engine braking to slow vehicle 5. For example, mechanical brakes 59 may be engaged when engine braking alone is unable to provide the requested braking torque.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 170, including a compressor 174 arranged between intake passages 142 and 144 and an exhaust turbine 176 arranged along an exhaust passage 135. Compressor 174 may be at least partially powered by exhaust turbine 176 via a shaft 180. In examples where turbocharger 170 is a variable geometry turbocharger (VGT), an effective aspect ratio (or flow area) of exhaust turbine 176 may be varied, as will be described below with respect to FIG. 2.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164. However, in other examples, engine 10 may not include throttle 162, such as where engine 10 is a diesel engine or a throttle-less gasoline engine.

An exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). An example continuously variable valve lift (CVVL) system is described in more detail below with regard to FIG. 2.

As further described herein, intake valve 150 and/or exhaust valve 156 may be deactivated or otherwise adjusted during selected conditions, such as during engine braking. For example, one or more cylinders of engine 10 may be operated unfueled. The number and identity of the cylinders operated unfueled may be symmetrical or asymmetrical, such as by selectively discontinuing fueling to one or more cylinders on only a first engine bank, selectively discontinuing fueling to one or more cylinders on only a second engine bank, or selectively discontinuing fueling to one or more cylinders on each of the first and second engine banks. In the case of engine braking, the intake valve 150 and/or the exhaust valve 156 may be adjusted by the CVVL system to increase in-cylinder pumping losses, as will be elaborated herein with respect to FIG. 4.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Alternatively, spark may be provided retarded from MBT timing to create a torque reserve. Controller 12 may input engine operating conditions, including engine speed, engine load, and exhaust gas AFR, into a look-up table and output the corresponding spark timing for the input engine operating conditions, for example. However, in other examples, spark plug 192 may be omitted, such as when compression ignition is used.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse-width of signal FPW received from controller 12 via an electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternative embodiment, injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving a signal from accelerator pedal position sensor 134 or brake pedal position sensor 137 indicating that braking is requested, controller 12 may discontinue fueling to cylinder 14 by discontinuing signal FPW from electronic driver 168 so that fuel is not delivered via fuel injector 166 and may further adjust intake valve 150 and exhaust valve 156 via actuators 152 and 154, respectively.

As described above, FIG. 1 shows only one cylinder of a multi-cylinder engine. As such, each cylinder may similarly include its own set of intake/exhaust valves, fuel injector(s), spark plug(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1 with reference to cylinder 14.

As mentioned above, the engine may include a VGT to provide boosted air to the engine intake. Variable vanes of the VGT may be arranged in a nozzle of a VGT turbine to control a flow of exhaust gas through the turbine, the exhaust gas flow driving rotation of the VGT. The flow of exhaust gases through the VGT turbine may be further illustrated in a cross-sectional view of a VGT mechanism 200 shown in FIG. 2. VGT mechanism 200 includes a turbine 201. In one example, turbine 201 may be turbine 146 of FIG. 1. Turbine 201 may include a volute or housing 202 that encloses a turbine nozzle 210 and a turbine wheel 220 having turbine blades 222. For example, housing 202 may include an inlet passage 204 and an outlet passage 206 each in communication with turbine nozzle 210. Thus, exhaust gas may flow from an exhaust manifold (e.g., exhaust manifold 148 of FIG. 1), through inlet passage 204, through turbine nozzle 210, across the turbine blades 222 of turbine wheel 220, into outlet passage 206, and out of the turbine 201, as indicated by arrows 224. From outlet passage 206, the exhaust gas may flow toward an emission control device, such as emission control device 178 of FIG. 1. Further, the flow of exhaust gases, e.g. the expansion of gases, through turbine 201 may be controlled by varying the geometry of turbine nozzle 210, and thus, the rotational speed of turbine 201 may be adjusted.

In one example, turbine nozzle 210 may be generally annular and share a central axis 230 with turbine wheel 220 and a drive shaft 215. That is, turbine wheel 220 and turbine nozzle 210 may be coaxial and concentric. Turbine nozzle 210 may include an annular unison ring 240, an annular nozzle wall plate 250, and one or more nozzle vanes 260. In one example, unison ring 240 and nozzle wall plate 250 may form a support and control structure for nozzle vanes 260. As such, in one example, the shape of nozzle vanes 260 may be adjusted by rotating one or both of unison ring 240 and nozzle wall plate 250. However, other control structures for nozzle vanes 260 are also possible.

A geometry of nozzle vanes 260 may be adjusted to control the flow of gases through turbine nozzle 210. For example, in a split sliding nozzle vane turbine (SSVNT), a length of the nozzle vanes 260 may be adjusted to control the flow of gases through turbine nozzle 210. In this example, a sliding vane of the nozzle vanes 260 may slide in a direction tangentially from an outer circumference of the nozzle wall plate 250. In another example, a sliding vane of the nozzle vane 260s may slide into and out from a recess or well over a range of engine operating conditions. More specifically, the sliding vane of the nozzle vanes 260 may slide axially into the nozzle wall plate 250, for example, in a direction parallel to the central axis 230 rather than tangentially from the outer circumference of the nozzle wall plate 250. In yet another example, a swing or pivot nozzle vane turbine may be provided in place of the SSVNT. In such examples, one or more of the nozzle vanes 260 of a swing or pivot nozzle vane turbine may pivot around an axis parallel with the central axis 230. The swing or pivot nozzle vane turbine may vary the flow of exhaust gas through turbine 201 by controlling an angle at which exhaust gas strikes the turbine blades 222.

Regardless of the type of turbine nozzle used in VGT mechanism 200, varying the geometry of the nozzle vanes 260 and/or the orientation of the nozzle vanes 260 may vary the cross-sectional area, and therefore an effective flow area, of inlet passage 204 of turbine nozzle 210 and the volumetric flow of gas through inlet passage 204. By adjusting the flow of gas through inlet passage 204, a velocity of the gas striking the turbine blades 222 may be controlled. As one example, by closing the nozzle vanes 260 (e.g., narrowing openings between each of the nozzle vanes 260), a flow velocity of the gas may be increased when the gas contacts the turbine blades 222, thereby increasing a rotational speed of the turbine 201. Conversely, opening the nozzle vanes 260 (e.g., widening the openings between each of the nozzle vanes 260) may decrease the gas flow velocity through the turbine nozzle 210, retarding the turbine speed.

During braking events, where slowing of a vehicle by engine braking is demanded, the nozzle vanes 260 may be adjusted to a more closed position to decrease the cross-sectional area of the inlet passage 204 of turbine nozzle 210. By adjusting the nozzle vanes 260 to the more closed position, the flow of gas from the exhaust manifold into turbine nozzle 210 may be restricted, thereby increasing gas pressure in the exhaust manifold upstream of turbine nozzle 210, referred to herein as "backpressure." Backpressure may be leveraged for engine braking by exerting a force against piston movement in engine cylinders during an exhaust stroke. The force resisting piston movement may be a counterforce to the engine, resulting in increased pumping losses. Further, a negative (e.g., braking) torque is produced that effectively slows engine speed.

When the nozzle vanes 260 are in a more closed position, the vanes may still allow a reduced amount of gas flow through openings between the vanes. In other words, the vanes may be configured to maintain a minimum amount of opening even when in a more closed position. A maximum exhaust braking torque provided by closing the VGT vanes may be bound, in part, by a minimum gas flow rate through the vanes when adjusted to a more closed position. The minimum opening of the vanes may vary depending on a geometry of the VGT. For example, some VGTs may have a minimum opening that is 30% of a maximum opening (e.g., a fully open position) of the vanes. Other VGTs may have minimum openings of 10% or 20% of the maximum opening. The produced braking torque may also be dependent upon a maximum flow rate of air into the engine, which may be low due to a low boost pressure provided (e.g., via compressor 174 of FIG. 1) during braking events.

In some examples, a more closed position also may be utilized during lower engine loads or other engine operating conditions where exhaust gas production is insufficient to meet a desired boost demand. As such, a more closed position may decrease an opening between adjacent turbine blades, thereby accelerating exhaust gas flow through the opening to the turbine, mimicking the effects of exhaust gas production at higher engine loads.

In alternative examples, the engine may include a fixed geometry turbocharger (FGT) instead of the VGT. The geometry of the turbine nozzle is invariable in the FGT. Exhaust gas flow to the FGT turbine may be controlled by an exhaust wastegate, which may provide a bypass around the turbine. The wastegate may include a valve positioned therein for varying an amount of flow through the wastegate. When the wastegate valve is fully closed and blocking gas flow therethrough, all exhaust gas flow through the exhaust manifold may be routed to the turbine. By increasing gas flow to the FGT turbine and blocking flow around the FGT turbine via the wastegate, the exhaust manifold pressure upstream of the FGT turbine may increase. However, in some examples, similar to the vanes of the VGT, the wastegate may be configured to maintain a minimum opening even when the wastegate valve is in a fully closed position, such as an opening that is 5% or 10% of a maximum opening of the wastegate. Thus, a maximum increase in exhaust manifold pressure for exhaust braking may be affected by the minimum opening of the wastegate that may be maintained regardless of engine operations. Note that, in some examples, the engine may include both a wastegate and a VGT.

Therefore, other mechanisms of engine braking may be combined with the exhaust backpressure created via VGT and/or wastegate control. One such mechanism is decompression (e.g., compression release) engine braking, which may include opening cylinder exhaust valves before an end of the compression stroke to release compressed gas. However, simply releasing the compressed gas may result in audible noise. Valve actuation mechanisms that enable precise valve control, such as CVVL, may reduce an amount of noise produced during the compression release.

Figure 3:
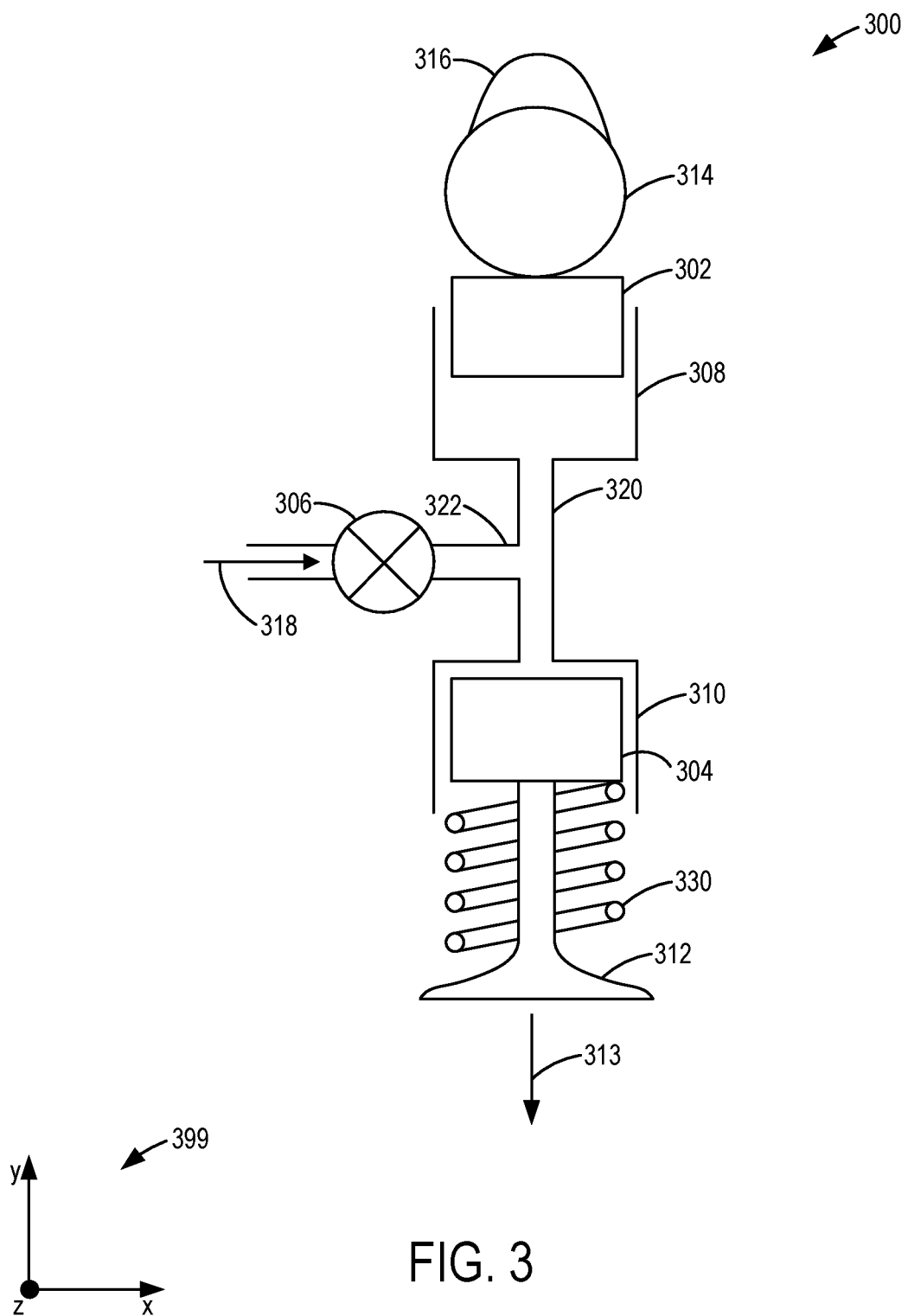
FIG. 3 shows a schematic view of an example continuously variable valve lift mechanism for an engine.

FIG. 3 schematically shows an example CVVL system 300. CVVL system 300 is a hydraulic valve actuation mechanism and may be included in intake valve actuator 152 and exhaust valve actuator 154 of FIG. 1, for example. Further, FIG. 3 depicts an x-y planar view of CVVL system 300, as shown by references axes 399. CVVL system 300 hydraulically couples a cam 314 of a camshaft to a valve 312 of a cylinder. Valve 312 may be one of an intake valve and an exhaust valve of a cylinder. In particular, the CVVL system 300 may be configured so that adjusting an amount of hydraulic pressure between the cam 314 and the valve 312 changes an amount of valve lift for valve 312.

As shown in FIG. 3, CVVL system 300 includes a cam piston 302 in a cam cylinder 308 and a valve piston 304 in a valve cylinder 310. Each of the cam cylinder 308 and the valve cylinder 310 may be at least partially filled with hydraulic fluid, and the cam cylinder 308 may be fluidically coupled to the valve cylinder 310 via an inter-cylinder line 320. Further, cam 314 may remain in contact with cam piston 302, and an amount of pressure in the cam cylinder 308 may vary based on the position of cam piston 302, which is controlled by the cam 314. Therefore, the pressure is lower at base circle and higher when a lobe 316 of cam 314 is in contact with cam piston 302, with the pressure increasing as the lift of the lobe portion in contact with the cam piston increases, as this further displaces the cam piston in the negative y-direction. This may in turn increase an amount of hydraulic pressure in valve cylinder 310 that is applied to valve piston 304, which may adjust a position of valve 312. When the hydraulic pressure applied to valve piston 304 overcomes an opposing spring force of a valve spring 330, valve 312 may open in a valve lift direction 313. Increasing the amount of hydraulic pressure may cause valve 312 to further move in the valve lift direction 313, resulting in a greater degree of opening (e.g., amount of lift) of valve 312. Valve lift direction 313 is parallel to the y-axis of reference axes 399. In particular, increasing an amount of valve lift for valve 312 includes moving the valve in the negative y-direction, with respect to reference axes 399. When the hydraulic pressure applied to valve piston 304 is less than the spring force of valve spring 330, valve spring 330 may maintain valve 312 closed.

An amount of hydraulic pressure in the CVVL system 300 may be adjusted by adjusting a hydraulic control valve 306, which may be positioned in a hydraulic supply line 322. For example, hydraulic fluid in CVVL system 300 may be provided and refreshed via the hydraulic supply line 322. As one example, hydraulic control valve 306 may be adjustable between a plurality of positions ranging from fully closed (in which flow of the hydraulic fluid through hydraulic control valve 306 is blocked) and fully open (in which a maximum flow area is provided in hydraulic control valve 306). In some examples, hydraulic control valve 306 may be a continuously variable valve, while in other examples, hydraulic control valve 306 may include a finite number of steps or positions. In still other examples, hydraulic control valve 306 may be an on/off valve adjustable between the fully closed position and the fully open position and no positions in between. Further, hydraulic control valve 306 may be an electronically actuated valve that is adjusted in response to (e.g., responsive to) a control signal from an electronic controller, such as controller 12 of FIG. 1, in order to adjust the amount of valve lift of valve 312. Adjusting the amount of valve lift for valve 312 may change one or more cylinder operating parameters by adjusting gas flow to and/or from the cylinder.

Further, by adjusting the hydraulic pressure of CVVL system 300, the valve may be opened or closed at any cam position. For example, increasing the hydraulic pressure of CVVL system 300 (e.g., above an upper threshold pressure) may enable valve 312 to open even when cam 314 is on base circle, and decreasing the hydraulic pressure of CVVL system 300 (e.g., below a lower threshold pressure) may maintain valve 312 closed, even when lobe 316 is in contact with cam piston 302. For example, the hydraulic fluid may apply a force to valve piston 304 that is greater than the spring force of valve spring 330, regardless of the position of cam 314, when the hydraulic pressure is greater than the upper threshold pressure, resulting in valve 312 being open while the hydraulic pressure is maintained above the upper threshold pressure. In contrast, the force applied on valve piston 304 by the hydraulic fluid may be less than the spring force of valve spring 330, even when lobe 316 is at its highest lift, when the hydraulic pressure is less than the lower threshold pressure, resulting in valve 312 being closed while the hydraulic pressure is maintained below the lower threshold pressure. Adjusting the pressure of the hydraulic fluid may facilitate precise adjustments to an opening timing, closing timing, and lift of valve 312. For example, the pressure may be adjusted to any pressure between and including the lower threshold pressure and the upper threshold pressure based on a desired amount of opening or closing of the valve 312 at a given point in an engine cycle.

Note that CVVL system 300 is provided by way of example, and other mechanisms that enable continuously variable valve lift are also possible. By including hydraulic valve mechanisms, such as CVVL system 300 shown in FIG. 3, in an engine system, an amount of valve lift may be continuously varied. CVVL may provide performance increases to the engine, such as decreased emissions and increased fuel efficiency. However, in some engine systems, the inventors herein have recognized that CVVL may be advantageously adapted for providing compression release in order to provide decompression engine braking and increased in-cylinder pumping losses.

Figure 4:
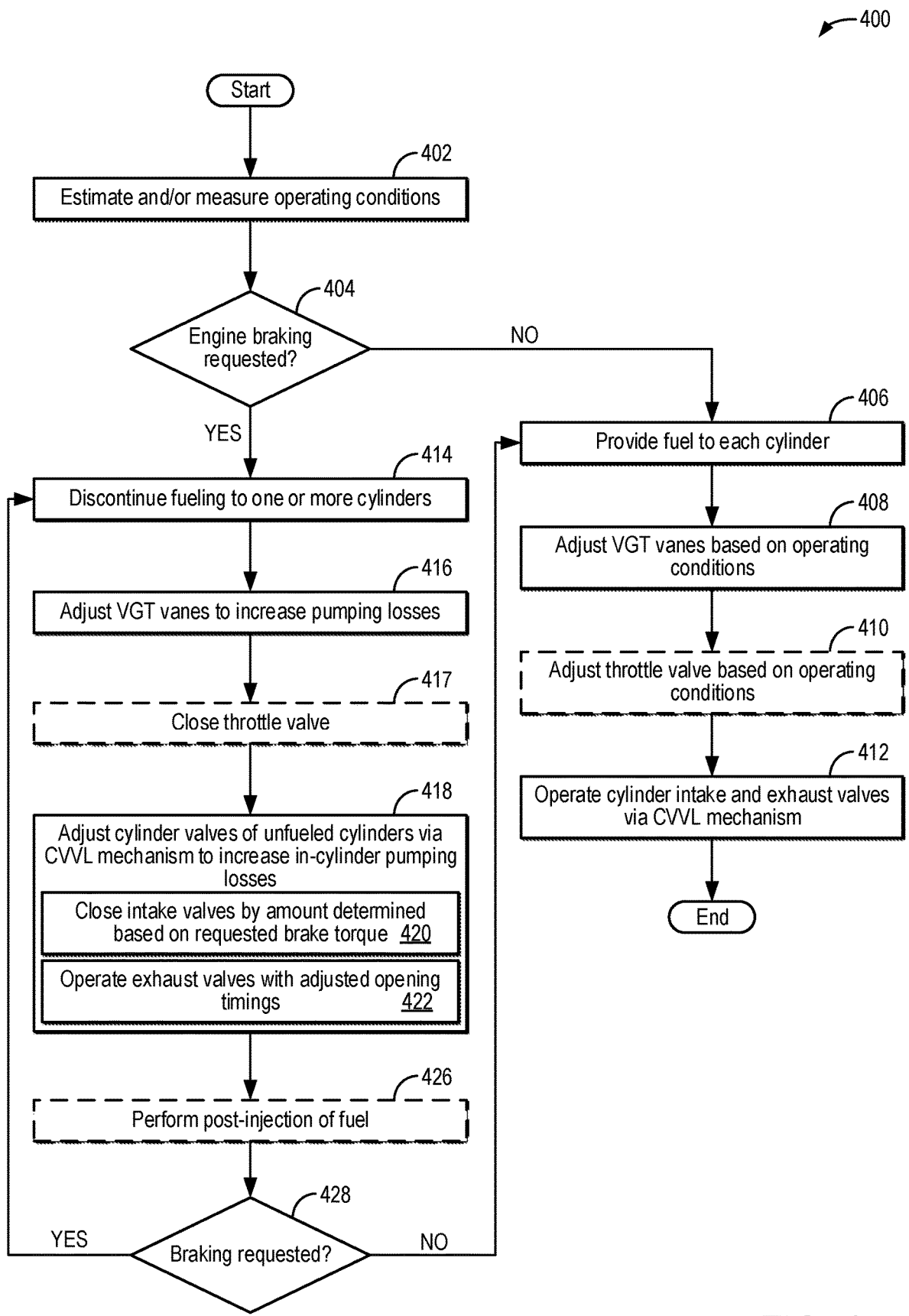
FIG. 4 shows a method for engine braking using adjustments to a variable geometry turbocharger and continuously variable valve lift system.

Therefore, an example method 400 for engine braking a vehicle is shown in FIG. 4. The vehicle may be a hybrid or a conventional vehicle including an engine with CVVL and VGT technologies, such as vehicle 5 from FIG. 1. Although method 400 will be described with respect to the engine system and components shown in FIGS. 1-3, method 400 may be applied to other engine systems without parting from the scope of this disclosure. Instructions for carrying out method 400 may be executed by a controller (e.g., controller 12 shown in FIG. 1) based on instructions stored on a memory of the controller and in conjunction with signals received from sensors of the engine system, such as the sensors described above with reference to FIG. 1 and elaborated below. The controller may employ actuators of the engine system to adjust engine operation according to the method described below.

At 402, method 400 includes estimating and/or measuring operating conditions. The operating conditions may include both engine and vehicle operating conditions. The engine operating conditions may include, for example, an engine speed, an intake manifold pressure (e.g., MAP), a mass air flow of intake air provided to the engine (e.g., MAF), an engine temperature, a torque demand, a boost demand, a fuel injection amount and timing, cylinder valve lift and timing settings, an exhaust gas temperature, a commanded AFR, a measured AFR, a spark timing, a brake pedal position, an accelerator pedal position, etc. As one example, the brake pedal position and the accelerator pedal position may be determined based on signals received from respective pedal position sensors (e.g., brake pedal position sensor 137 and accelerator pedal position sensor 134 of FIG. 1, respectively). Together, the accelerator pedal position and the brake pedal position may be used by the controller to determine the torque demand, which may be a positive torque demand or a negative (e.g., braking) torque demand. Further, the vehicle operating conditions may include, for example, a vehicle speed, a state of charge of a system battery, etc.

At 404, method 400 includes determining if engine braking is requested. For example, engine braking may be requested responsive to a change in one or more of the accelerator pedal position and the brake pedal position. As an example, engine braking may be requested responsive to a tip-out event, where the accelerator pedal position changes from a depressed position to an undepressed, neutral position or a less depressed position. As another example, engine braking may be requested responsive to the brake pedal position increasing (e.g., being further depressed). As still another example, engine braking may be requested responsive to a decrease in the demanded torque and/or in response to a non-zero requested brake torque, as determined from the accelerator pedal position and the brake pedal position. Further, engine braking may be requested when the engine speed is greater than a threshold engine speed. The threshold engine speed may be a pre-determined, non-zero engine speed stored in memory below which further slowing the engine (e.g., via engine braking) may result in the engine inadvertently shutting off.

If engine braking is not requested, method 400 proceeds to 406 and includes providing fuel to each cylinder. As such, combustion may occur in each cylinder to produce the demanded torque. As an example, the controller may determine a pulse-width of a fuel signal to send to a fuel injector of each cylinder (e.g., signal FPW shown in FIG. 1) based on the demanded torque and/or an amount of air inducted into the engine, such as by using a look-up table, algorithm or map that relates the demanded torque and/or the amount of air inducted into the engine to the pulse-width of the fuel signal. Further, the controller may transmit the fuel signal of the determined pulse-width to the corresponding fuel injector at a determined timing for producing the demanded torque, for example. In particular, the determined timing may be at or near top dead center (TDC) of the compression stroke.

At 408, method includes adjusting vanes of the VGT (e.g., VGT vanes) based on the operating conditions. For example, the vanes of the VGT, located in an exhaust turbine of the VGT (e.g., turbine 176 of FIG. 1) may be further opened to allow more exhaust flow through the turbine, thereby decreasing an exhaust backpressure, and/or to decrease a rotational speed of the turbine, such as when the engine load is lower (or exhaust gas production is otherwise insufficient to meet the boost demand). As another example, the VGT vanes may be further closed to increase the rotational speed of the turbine, such as to increase an amount of boost provided. Thus, a geometry of the VGT turbine may be adjusted to provide a desired amount of boost based on the operating conditions.

At 410, method 400 optionally includes adjusting a throttle valve based on the operating conditions. That is, if a throttle valve is present, such as throttle 162 of FIG. 1, the throttle valve may be further opened to increase air flow into an intake manifold of the engine and further closed to decrease air flow into the intake manifold. As an example, the throttle valve may be further opened responsive to an increase in the demanded torque and further closed responsive to a decrease in the demanded torque.

At 412, method 400 includes operating cylinder intake and exhaust valves via a CVVL mechanism. For example, the CVVL mechanism may be CVVL system 300 of FIG. 3, which may be included in a valve actuation system for each cylinder valve. The controller may adjust an opening timing, a closing timing, and a valve lift of each cylinder intake and exhaust valve via the CVVL mechanism, for example. As one example, to facilitate combustion in the cylinder, the intake valve of each cylinder may be opened during an intake stroke of the corresponding cylinder and may remain open until an end of the intake stroke or a beginning of a compression stroke, as will be illustrated with respect to FIG. 5. Further, the exhaust valve of each cylinder may be opened during an exhaust stroke of the corresponding cylinder and may remain open until the engine of the exhaust stroke or the beginning of the intake stroke, as will also be illustrated with respect to FIG. 5. Operating the CVVL mechanism to facilitate combustion may be referred to herein as operating in a combustion mode. Further, the controller may determine the opening timing, closing timing, and valve lift for the intake valve and the exhaust valve of each cylinder during each engine cycle based on the operating conditions, including the engine speed and the engine load. For example, the controller may input at least the engine speed and the engine load into one or more look-up tables, algorithms, or maps stored in memory, which may output the opening timing, closing timing, and valve life for the intake valve and the exhaust valve of each cylinder for the given engine cycle. The controller may then adjust the corresponding CVVL mechanism accordingly to provide the determined valve lift, such as by adjusting hydraulic pressure in the CVVL mechanism by transmitting a signal to a hydraulic control valve (e.g., hydraulic control valve 306 shown in FIG. 3). Thus, the intake and exhaust valves may open and close to facilitate combustion during the four stroke engine cycle.

Method 400 may then end. For example, method 400 may be repeated at a pre-determined frequency during vehicle operation. As another example, method 400 may be repeated responsive to a detected change in one or more operating conditions, such as detected by a change in an output of the pedal position sensor, for example.

Returning to 404, if engine braking is requested, method 400 proceeds to 414, and fueling is discontinued to one or more cylinders. In some examples, fueling is discontinued to every cylinder of the engine for a transient fuel shut off (TFSO) operation, wherein fueling is temporarily shut off to the entire engine while the vehicle speed is decreasing. In other examples, a portion of the cylinders may remain fueled while fueling is discontinued to the one or more cylinders so that the engine continues to produce torque. As an example, the controller may determine a number of cylinders to operate unfueled based on the requested (e.g., demanded) brake torque of the braking request, such as by inputting the requested brake torque into a look-up table, algorithm, or map stored in memory, which may output the number of cylinders to operate unfueled. As another example, the controller may make a logical determination regarding the number of cylinders to operate unfueled based on logic rules that are a function of the requested brake torque. In general, an amount of engine braking provided may increase as the number of unfueled cylinders increases. To discontinue fueling to the determined number of the one or more cylinders, the controller may discontinue sending the FPW signal the fuel injector of each of the one or more cylinders.

At 416, method 400 includes adjusting the VGT vanes to increase pumping losses. Adjusting the VGT vanes adjusts a geometry of a turbine nozzle of the turbine. For example, the VGT vanes may be closed (e.g., fully closed) to minimize a cross-sectional flow area of the turbine nozzle, thereby minimizing a volumetric flow of exhaust gas through the VGT turbine. In other examples, the VGT vanes may be further closed as the requested brake torque increases. Further closing the VGT vanes (e.g., decreasing the cross-sectional flow area of the turbine nozzle) increases backpressure in an exhaust manifold coupled to the engine, upstream of the turbine. The increased backpressure may exert a force against piston movement in each cylinder, as will be elaborated below. The force resisting piston movement may be a counterforce to the engine, resulting in increased pumping losses and the engine speed decreasing.

At 417, method 400 optionally includes closing the throttle valve. That is, if the throttle valve is present in the vehicle, it may be partially or fully closed to restrict air flow to the engine to aid the engine braking by increasing engine pumping losses. A degree of closing of the throttle valve may be increased as the requested brake torque increases until the fully closed position is reached.

At 418, method includes adjusting the cylinder valves of the unfueled cylinders via the CVVL mechanism to increase in-cylinder pumping losses. For example, the controller may adjust the hydraulic control valve to adjust the hydraulic pressure in the CVVL mechanism controlling the intake valve and exhaust valve of each unfueled cylinder. Operating the CVVL mechanism to facilitate engine braking may be referred to herein as operating in a braking mode.

As an example, the controller may input the requested brake torque into a look-up table, algorithm, or map stored in memory, which may output the amount to close the intake valve of each unfueled cylinder. In some examples, the controller may take into account the brake torque generated via adjusting the VGT vanes (e.g., at 416) and via adjusting the throttle valve, when included (e.g., at 417), in determining the at least one cylinder valve adjustment. For example, the controller may subtract a first brake torque portion generated by closing the VGT vanes (e.g., reducing the cross-sectional flow area of the turbine nozzle) and, when included, a second brake torque portion generated by closing the throttle valve from the requested brake torque to determine a third brake torque portion to be generated by the at least one cylinder valve adjustment. The at least one cylinder valve adjustment may include adjusting an intake valve lift, an intake valve opening timing, an intake valve closing timing, an exhaust valve lift, an exhaust valve opening timing, and/or an exhaust valve closing timing, as will be elaborated below.

Adjusting the cylinder valves of the unfueled cylinders via the CVVL mechanism to increase in-cylinder pumping losses may include closing the intake valves by an amount determined based on the requested brake torque, as indicated at 420. The more braking torque requested, the further the intake valve will be closed to create an increased counterforce within the cylinder as the piston rises. As one example, the intake valve may be held fully closed throughout an engine cycle (e.g., operated with zero lift) responsive to the requested brake torque (or the third brake torque portion described above) being greater than a non-zero, pre-determined brake threshold above which maximum engine braking is desired. As the requested brake torque decreases, the intake valve may be further opened to decrease pressure in the cylinder and cylinder pumping losses, as exhaust gas will escape into the intake manifold through the open intake valve.

Adjusting the cylinder valves of the unfueled cylinders via the CVVL mechanism to increase in-cylinder pumping losses may include operating the exhaust valves with an adjusted opening timing, as indicated at 422. As one example, the exhaust valves of the unfueled cylinder(s) may be opened at or near TDC of the exhaust stroke and may remain open until at or near bottom dead center (BDC) of the intake stroke, enabling pressurized exhaust gas from the exhaust manifold to enter the cylinder. For example, the exhaust valves of the unfueled cylinder(s) may be opened within a first threshold number of crank angle degrees before TDC and may remain open until being closed within a second threshold number of crank angle degrees before BDC. The first threshold number of crank angle degrees and the second threshold number of crank angle degrees may be pre-determined crank angle ranges that enable effective decompression of the cylinder. During the compression stroke, the piston may exert more energy to compress the higher pressure exhaust gas than if the cylinder valves were not adjusted, thus creating the braking torque to slow down the engine (and the vehicle). Further, because the exhaust manifold pressure is high due to the closed VGT vanes, a smaller amount of exhaust gas may flow out of the cylinder upon exhaust valve opening compared to when the exhaust manifold pressure is lower.

In some examples, the exhaust valves of the unfueled cylinder(s) may also be opened at or near TDC of the compression stroke and may remain open until at or near BDC of the power stroke, providing engine braking in a "two stroke" mode. For example, the cylinder may take in the higher pressure exhaust gas from the exhaust manifold via the open exhaust valve during the power stroke as the piston moves toward BDC and then compress the higher pressure exhaust gas during the exhaust stroke as the piston moves toward TDC. The two stroke mode may be used when the requested brake torque (or the third brake torque portion) is higher, as the two stroke mode may provide additional engine braking compared to the four stroke mode described above. Both the two stroke mode and the four stroke mode may be referred to herein as a compression engine braking mode (e.g., a sub-mode of engine braking). An example of the compression engine braking mode will be described below with respect to FIG. 6.

As another example, the exhaust valves of the unfueled cylinder(s) may be closed at or near TDC of the exhaust stroke, as a force used to pull vacuum in the cylinder generated due to the closed intake and exhaust valves opposes piston motion between TDC and BDC (e.g., during the traditional intake stroke). Just prior to reaching BDC, the exhaust valves of the unfueled cylinder(s) may be opened for a short duration to allow the vacuum to be released. As such, the vacuum may not assist the piston return to TDC. The exhaust valves may again be closed at or near BDC of the compression stroke, as soon as the cylinder has filled with high pressure exhaust gas, in order to provide resistance during the compression stroke. Just prior to reaching TDC, however, the exhaust valves of the unfueled cylinder(s) may be again opened for the short duration to release the newly compressed exhaust gas, resulting in an evacuated cylinder. The process may be repeated, pulling vacuum on the evacuated cylinder during the traditional power stroke and compressing exhaust gas during the compression stroke. Such operation is referred to herein as a dual cycle engine braking mode.

Thus, the exhaust valves may be opened for a third threshold number of crank angle degrees prior to BDC during the power and intake strokes and prior to TDC during the exhaust and compression strokes. The third threshold number of crank angle degrees may correspond to a pre-determined crank angle range that enables the pressure or vacuum to be relieved in the cylinder, for example. As another example, the third threshold number of crank angle degrees may be adjusted by the controller to modulate the braking effort, such as increased to decrease the amount of braking torque produced. For example, the amount of force opposing the motion of the piston may be reduced by releasing the vacuum and compressed gas farther from BDC and TDC, respectively. An example of the dual cycle engine braking mode will be described below with respect to FIG. 7. In this way, each motion of the piston may be opposed, making the dual cycle mode highly effective for engine braking.

If additional noise reduction is desired, then only the vacuum-pulling portion may be performed by holding the exhaust valves open while the piston travels from BDC to TDC, referred to herein as a silent engine braking mode. An example of the silent mode engine braking mode will be described below with respect to FIG. 8. As another example, partial noise attenuation with increased braking force may be achieved by performing compression during the compression stroke, as described above, but opening the exhaust valves sooner during the compression stroke (e.g., further before TDC).

Further, it may be understood that the valves of any cylinders that remain fueled may be operated in the combustion mode described above at 412.

Thus, an overall amount of brake torque provided by the engine braking may be a combination of engine pumping losses generated by closing the VGT vanes (e.g., the first brake torque portion), throttle pumping losses generated by closing the throttle valve (e.g., the second brake torque portion), when included, and in-cylinder pumping losses generated by the cylinder valve adjustments via the CVVL mechanism (e.g., the third brake torque portion). If the engine braking alone cannot meet the requested brake torque, friction brakes (e.g., mechanical brakes 59 of FIG. 1) may be engaged to provide the deficit.

At 426, method 400 optionally includes performing a post-injection of fuel. As one example, the post-injection may be performed during the power stroke or late in the exhaust stroke, and the injected fuel may not be combusted. Instead, the unburnt fuel may flow to a downstream emission control device (e.g., emission control device 178 of FIG. 1) to rebalance the emission control device or to generate heat for a regeneration event, for example. Thus, the post-injection may optionally occur responsive to a request for emission control device rebalancing or regeneration, such as when the one or more unfueled cylinders pump air to the emission control device. Conversely, the post-injection of fuel may not be performed when the intake valve is maintained fully closed throughout the engine cycle and no air flow passes through the unfueled cylinder. As one example, the post-injection may be performed in the one or more unfueled cylinders. In another example, the post-injection may be performed in an active cylinder in a same bank as the one or more unfueled cylinders in order to provide the post-injected fuel to a shared emission control device. In still other examples, when the system includes an additional injector coupled in the exhaust system (e.g., to the exhaust manifold), the post-injected fuel may be injected by the additional exhaust system injector.

At 428, it is again determined if braking is requested. For example, braking may no longer be requested responsive to a tip-in event, wherein the accelerator pedal is depressed and indicates an increased torque demand. If braking is not requested, method 400 proceeds to 406 and includes providing fuel each cylinder, as described above. For example, fueling may be resumed in the cylinders that were unfueled during the engine braking.

In this way, the CVVL mechanism and the VGT may be used in combination to increase engine pumping losses and slow the vehicle. Further, loud noises associated with decompression braking may be reduced by utilizing high exhaust manifold pressures that are caused by closing the VGT vanes. Further still, the brake torque provided may be precisely adjusted by adjusting one or more of the VGT vanes, the cylinder intake and exhaust valve settings in the unfueled cylinders, and the throttle position.

Figure 5:
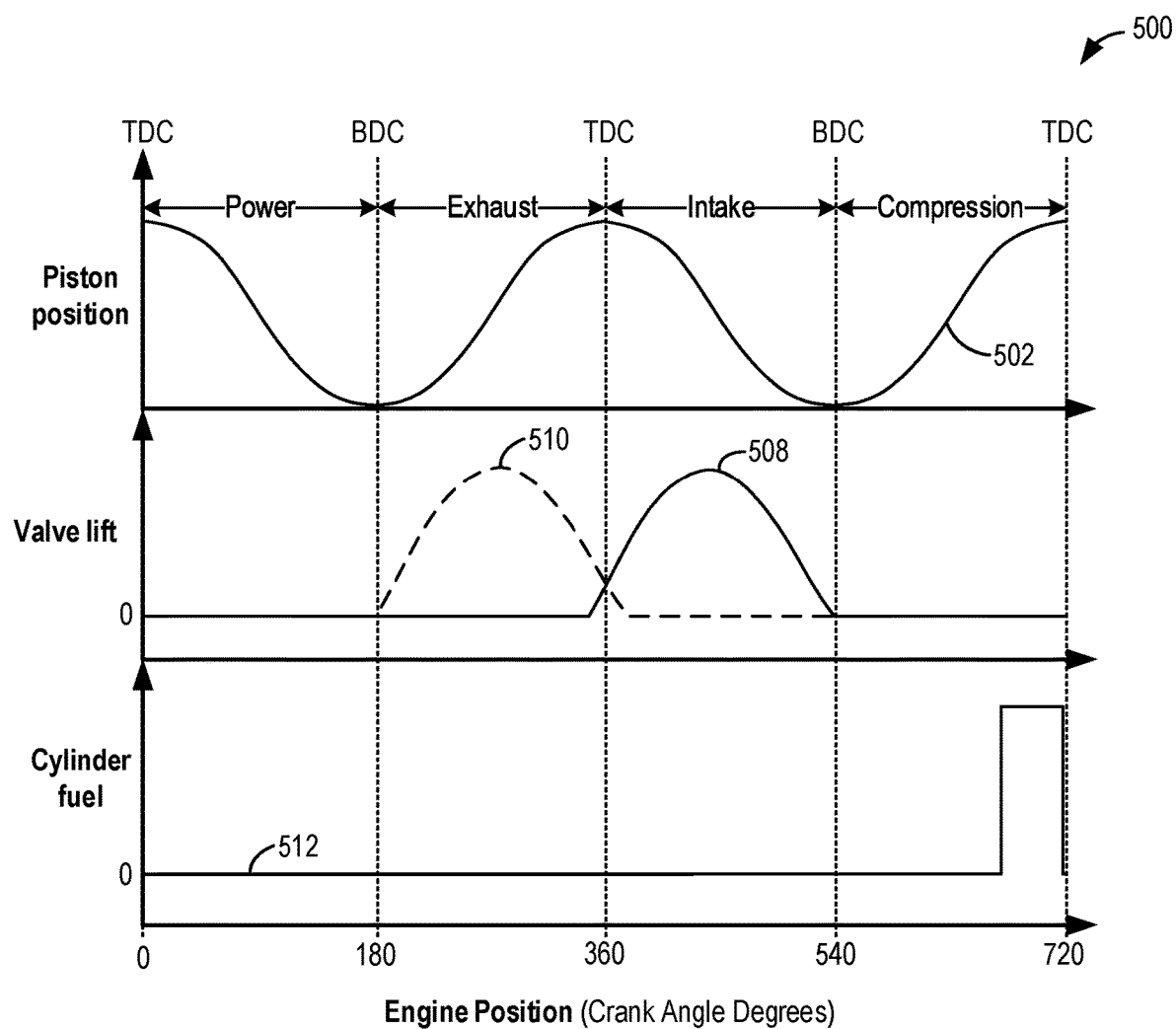
FIG. 5 shows an exemplary timing chart of operating a cylinder during an engine cycle.

Turning now to FIG. 5, an exemplary timing chart 500 of operating a cylinder in a combustion mode is shown. The cylinder may be cylinder 14 of engine 10 shown in FIG. 1, for example, with valve timing and lift adjusted via a CVVL system (e.g., CVVL system 300 of FIG. 3). Timing chart 500 shows one cylinder cycle, referring to four strokes of an engine cycle within the cylinder. A piston position relative to top dead center (TDC), bottom dead center (BDC), and the four strokes of the combustion cycle (intake, compression, power, and exhaust) is shown in a plot 502. Further, an intake valve lift is shown in a plot 508, an exhaust valve lift is shown in a dashed plot 510, and a cylinder fuel injection signal (e.g., as transmitted to a fuel injector of the cylinder, such as fuel injector 166 of FIG. 1) is shown in a plot 512. For all of the above, the horizontal axis represents engine position (e.g., in crank angle degrees), with the crank angle degrees (CAD) increasing from left to right. The vertical axis represents each labeled parameter. For plot 502, the vertical axis shows piston position relative to TDC. For plot 512, an increase in magnitude of the parameter above zero indicates actuation of the fuel injector. For plots 508 and 510, the lift of the corresponding valve increases up the vertical axis from zero. Further, the stroke of the combustion cycle is indicated at the top of timing chart 500. In the example shown, the power stroke corresponds to an interval from 0 CAD to 180 CAD, the exhaust stroke corresponds to an interval from 180 CAD to 360 CAD, the intake stroke corresponds to an interval from 360 CAD to 540 CAD, and the compression stroke corresponds to an interval from 540 CAD to 720 CAD.

Just prior to the start of the intake stroke (e.g., around 350 CAD), the intake valve is opened at an intake valve opening timing (plot 508). As shown in timing chart 500, an exhaust valve open duration may overlap with an intake valve open duration, in some examples. For example, after the start of the intake stroke (e.g., around 380 CAD), the exhaust valve is closed at an exhaust valve closing timing (dashed plot 510), resulting in positive valve overlap between the intake valve and the exhaust valve. During the intake stroke, air is introduced into the cylinder via the intake valve as the piston (plot 502) moves toward BDC, which is the point at which the piston is at its bottom-most position in the cylinder at the end of the intake stroke (e.g., when the combustion chamber is at its largest volume).

At the beginning of the compression stroke (e.g., around 540 CAD), the intake valve closes at an intake valve closing timing (plot 508). The piston (plot 502) moves toward the cylinder head so as to compress the air within the cylinder. The point at which the piston is at the end of its stroke and closest to the cylinder head (e.g., when the combustion chamber is at its smallest volume) is typically referred to as TDC. During the compression stroke, as the piston (plot 502) moves toward TDC, a cylinder fuel injection event introduces an amount of cylinder fuel (plot 512) into the cylinder before ignition at the end of the compression stroke (e.g., just before 720 CAD). The ignition triggers combustion in the cylinder, and because the intake valve (plot 508) and the exhaust valve (dashed plot 510) are both closed during the power stroke, the expanding combustion gases drive the piston back down toward BDC during the power stroke, producing positive engine torque. At the start of the exhaust stroke, exhaust valve opens at an exhaust valve opening timing (dashed plot 510), and the combustion gases are pushed out of the cylinder through the open exhaust valve as the piston rises toward BDC (plot 502).

In this way, the intake and exhaust valve opening timings, closing timings, and lift amounts facilitate combustion in the cylinder to produce positive engine torque. Note that the valve opening timings, closing timings, and lift amounts shown in FIG. 5 are exemplary, and other intake and exhaust valve opening timings, closing timings, and lift amounts that facilitate combustion may be used without parting from the scope of this disclosure. As one example, the intake valve and the exhaust valve may be operated without positive valve overlap, such as by adjusting the exhaust valve closing timing to occur earlier (e.g., during the exhaust stroke) and/or adjusting the intake valve opening timing to occur later (e.g., during the intake stroke).

Figure 6:
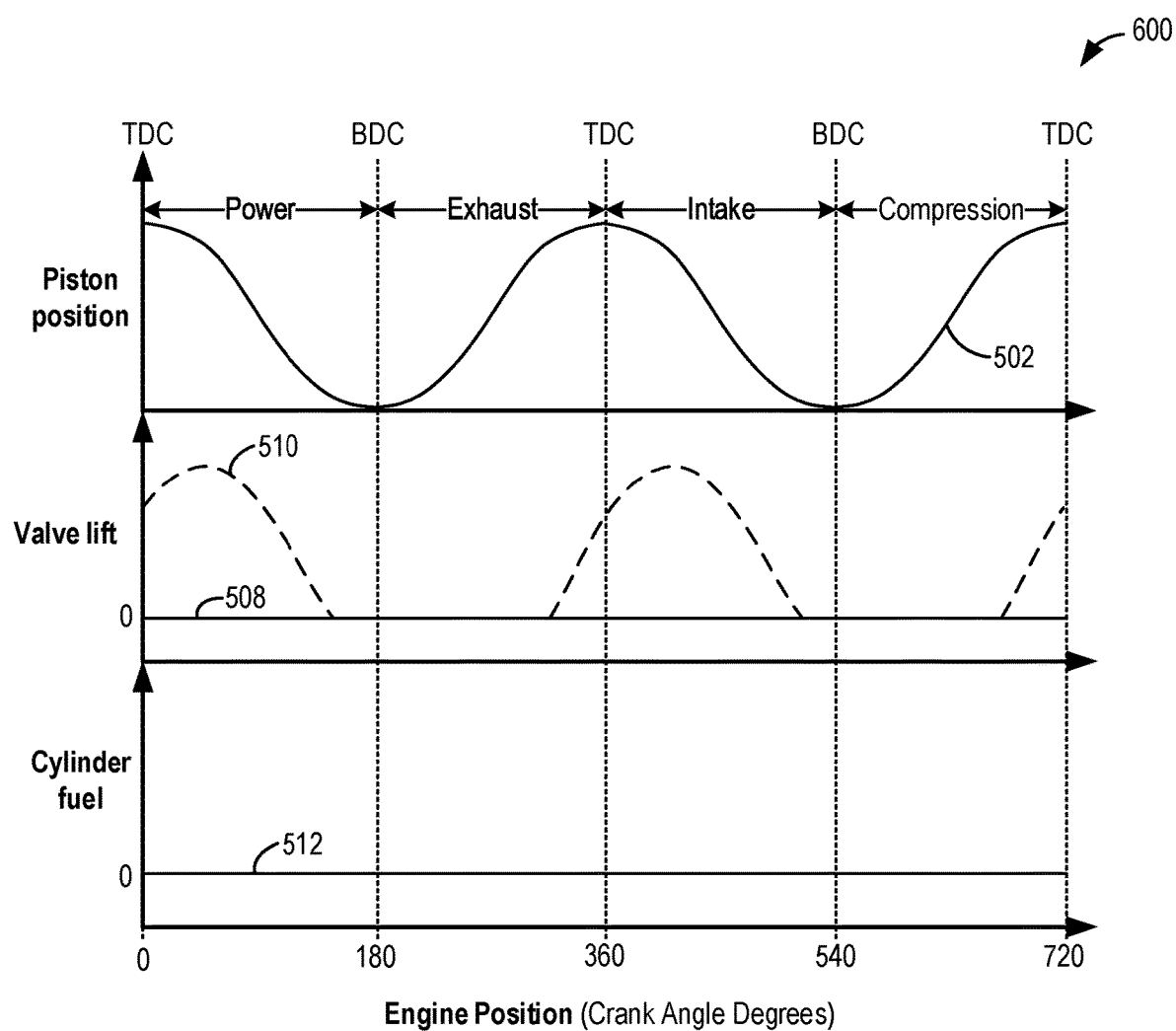
FIG. 6 shows a first exemplary timing chart of operating a cylinder during an engine cycle while an engine braking event is occurring.

Continuing to FIG. 6, a first exemplary timing chart 600 for operating the cylinder in a braking mode is shown. In particular, timing chart 600 shows operating the cylinder in a compression engine braking mode (e.g., sub-mode), wherein compression of higher pressure exhaust gas is used to generate braking torque. Similar to timing chart 500 of FIG. 5, timing chart 600 shows one cylinder cycle. Plots in FIG. 6 that correspond to the same parameters as described in FIG. 5 have the same reference numbers and will not be reintroduced. For example, the cylinder may be transitioned between operating in the combustion mode shown in FIG. 5 and the compression engine braking mode shown in FIG. 6 via adjustments to the CVVL system responsive to a braking event.

Even though combustion is discontinued in the compression engine braking mode, the piston continues to move up and down within the cylinder. Therefore, plot 502 of FIG. 6 does not experience any change in the compression engine braking mode as compared to the combustion mode shown in timing chart 500 of FIG. 5. However, the intake valve remains in a closed position during all four strokes of the cylinder cycle while operating the cylinder and the CVVL system in the compression engine braking mode, as shown by the intake valve lift remaining at zero throughout the cylinder cycle (plot 508). For example, the closed intake valve will not allow air to flow from an intake manifold into the cylinder nor allow for pressured exhaust gas to flow into the intake manifold, allowing for greater engine braking torque to be produced compared with opening the intake valve.

Additionally, the exhaust valve may be in an open position at different times while operating in the compression engine braking mode than while operating in the combustion mode shown in FIG. 5. In the example shown in FIG. 6, the exhaust valve begins to open during the end of the exhaust stoke at around 315 CAD, as the piston moves toward TDC, and reaches a fully open position at around 400 CAD. While the exhaust valve is in the open position and the piston moves toward TDC, residual exhaust gas from a previous combustion cycle and/or intake air may flow from the cylinder to an exhaust manifold. However, because the exhaust manifold is pressurized due to closing of a VGT (not shown in FIG. 6), a larger portion of gas may remain in the cylinder compared to when the exhaust manifold is not pressurized. Further, if the pressure in the exhaust manifold is higher than that in the cylinder even while the piston moves toward TDC, exhaust gas may flow from the pressurized exhaust manifold into the cylinder. While the exhaust valve is open during the intake stroke and the piston moves back down toward BDC, the pressurized exhaust gas is drawn into the cylinder from the exhaust manifold until the exhaust valve is fully closed again at around 500 CAD, trapping the pressurized exhaust gas within the cylinder. The pressurized exhaust gas in the cylinder applies a counter-force to the piston as it moves toward TDC during the compression stroke, creating a (negative) braking torque.

The exhaust valve may remain closed until the end of the compression stroke at around 680 CAD, as the piston nears TDC (plot 502). The exhaust valve may then open (dashed plot 510), enabling the compressed exhaust gas to be pushed back into the exhaust manifold, thereby decreasing an amount of force available to push down the piston during the subsequent power stroke. Further, the exhaust valve may remain open during a majority of the power stroke until it reaches a fully closed position at around 140 CAD, still within the power stroke of the piston. As the piston moves from TDC to BDC, pressurized exhaust gas from the exhaust manifold will re-enter the cylinder through the exhaust valve. With the exhaust valve remaining closed until around 315 CAD and the piston moving from BDC to TDC during the exhaust stroke, the cylinder may create a braking torque as the pressurized exhaust gas resists compression by the piston.

Unlike timing chart 500 of FIG. 5, in FIG. 6, plot 512 shows that fuel is no longer injected during the compression stoke of the cylinder cycle, as combustion is not performed in the cylinder. Further, a post-injection of fuel does not occur because the intake valve is maintained fully closed throughout the engine cycle (plot 508). In other examples, the post-injection may be performed, such as when rebalancing of an emission control device is requested. In other words, if no air flow passes through the cylinder due to the intake valve being closed, then the desired fueling for the cylinder to keep the emission control device in balance is zero, and if air flow passes through the cylinder due to the intake valve being opened, the desired fueling is non-zero.

Figure 7:
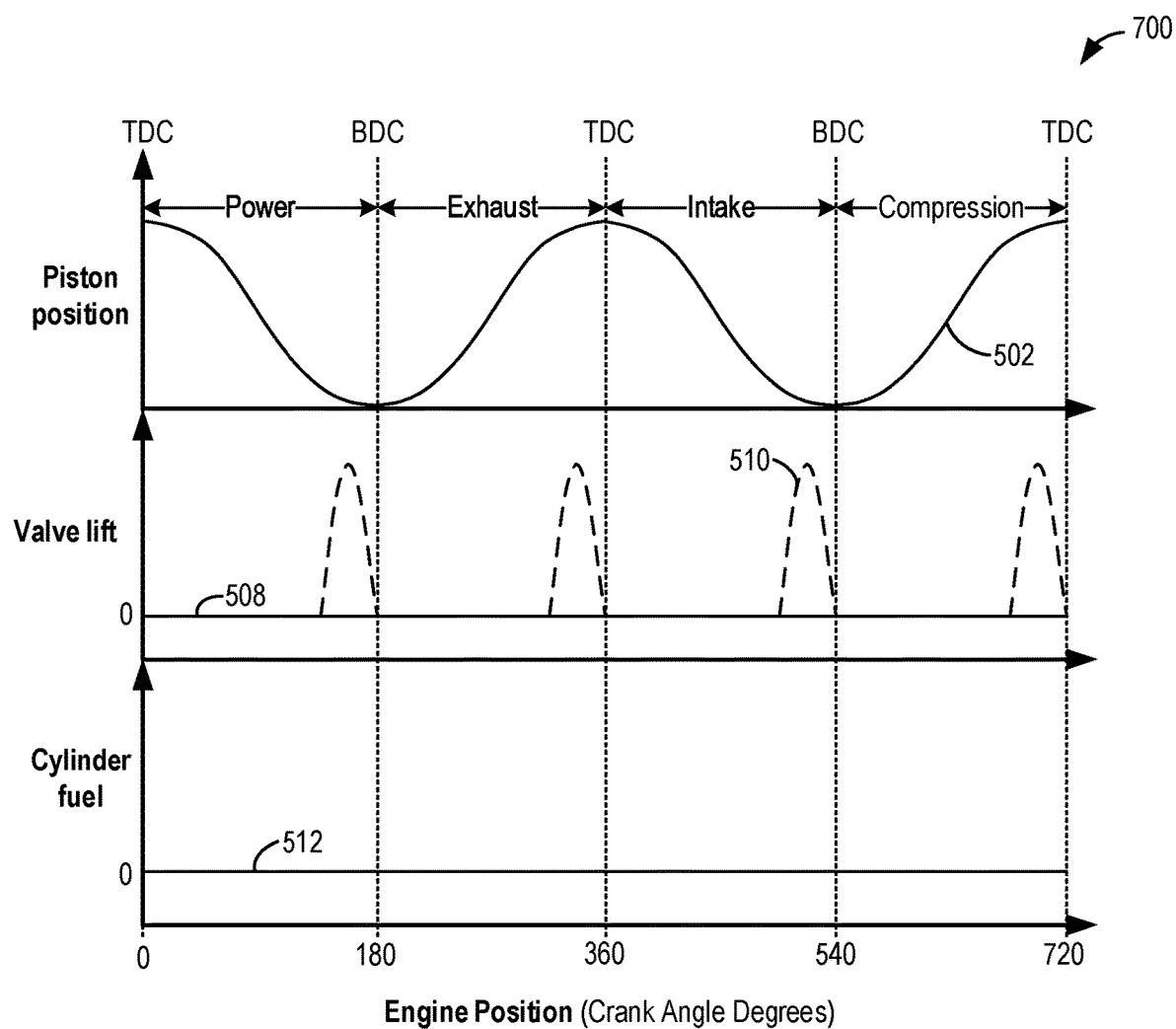
FIG. 7 shows a second exemplary timing chart of operating a cylinder during an engine cycle while an engine braking event is occurring.

Continuing to FIG. 7, a second exemplary timing chart 700 for operating the cylinder in an engine braking mode is shown. In particular, timing chart 700 shows operating the cylinder in a dual cycle engine braking mode (e.g., sub-mode), wherein both pulling vacuum in the cylinder and the compression of higher pressure exhaust gas are used to generate braking torque. Similar to timing chart 500 of FIG. 5 and timing chart 600 of FIG. 6, timing chart 700 shows one cylinder cycle. Plots in FIG. 7 that correspond to the same parameters as described in FIG. 5 have the same reference numbers and will not be reintroduced. For example, the cylinder may be transitioned between operating in the combustion mode shown in FIG. 5 and the dual cycle engine braking mode shown in FIG. 7 via adjustments to the CVVL system responsive to a braking event.

Similar to FIG. 6, plot 502 of FIG. 7 does not experience any change in the engine braking mode as compared to the combustion mode shown in timing chart 500 of FIG. 5, and the intake valve remains in a closed position during all four strokes of the cylinder cycle while operating the cylinder and the CVVL system in the dual cycle engine braking mode (plot 508). Additionally, the exhaust valve may be in an open position at different times while operating in the dual cycle engine braking mode than while operating in the combustion mode shown in FIG. 5 and while operating in the compression engine braking mode shown in FIG. 6. In the example shown by dashed plot 510 in FIG. 7, the exhaust valve begins to open near the end of each stoke for a short duration (e.g., for approximately 40 CAD) compared with the open durations shown in FIGS. 5 and 6 (e.g., for approximately 180 CAD).

For example, during the (traditional) power stroke, the exhaust valve remains closed as the piston moves toward BDC, resulting engine braking due to vacuum forming within the cylinder that resists the downward movement of the piston. Thus, the power stroke provides a vacuum portion of the dual cycle engine braking mode. The exhaust valve is opened for a threshold number of crank angle degrees before BDC to allow high pressure exhaust gas (e.g., pressurized by closing the VGT) to enter the evacuated cylinder and closed again at BDC. In the example shown, the exhaust valve is opened at around 140 CAD and closed at around 180 CAD (dashed plot 510). During the (traditional) exhaust stroke, the high pressure exhaust gas trapped within the cylinder is compressed as the piston rises toward TDC, providing further engine braking by resisting the upward movement of the piston. Thus, the exhaust stroke provides a compression portion of the dual cycle engine braking mode. The exhaust valve is opened for the threshold number of crank angle degrees before TDC to allow the compressed gas to be quickly released. In the example shown, the exhaust valve is opened at around 320 CAD and closed at around 360 CAD (dashed plot 510). As such, the cylinder is again prepared for the vacuum portion of the dual cycle engine braking. The process then repeats, with another vacuum portion during the (traditional) intake stroke and another compression portion during the (traditional) compression stroke.

Similar to timing chart 600 of FIG. 6, post-injection of fuel is not performed (plot 512) because the intake valve is held fully closed (plot 508). As such, air is not pumped to the emission control device via the cylinder.

Figure 8:
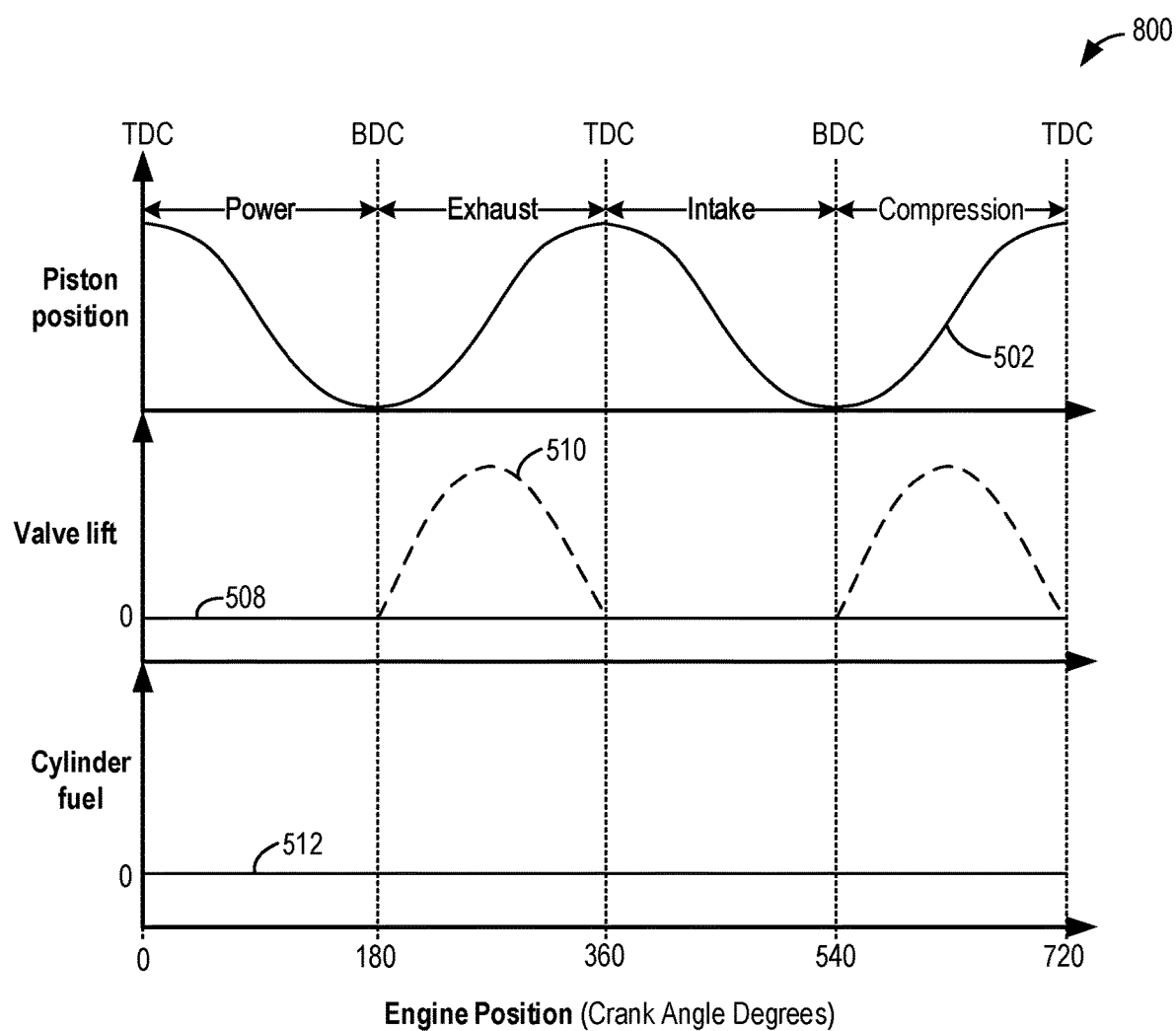
FIG. 8 shows a third exemplary timing chart of operating a cylinder during an engine cycle while an engine braking event is occurring.
Figure 9:
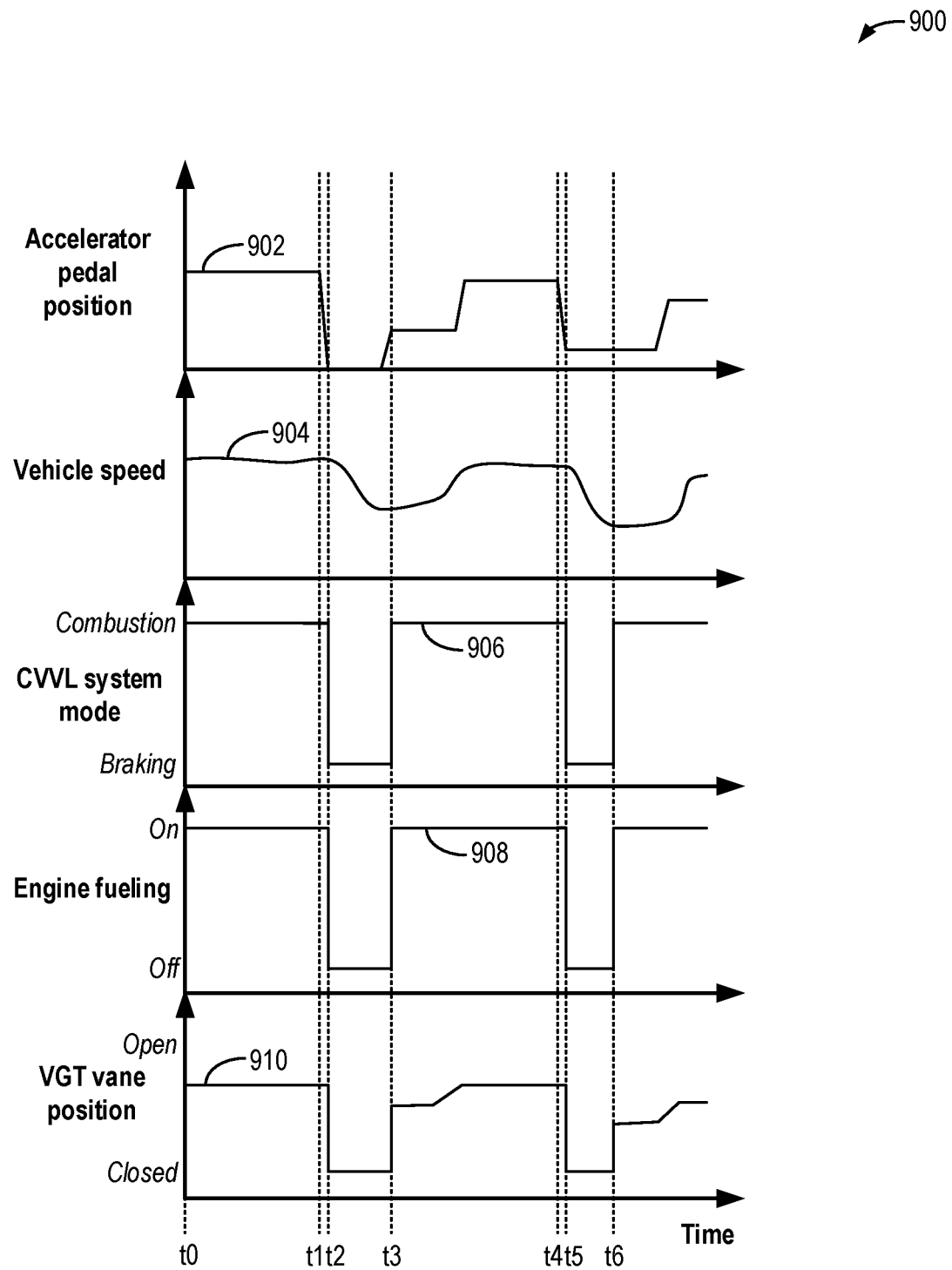
FIG. 9 shows a prophetic example timeline for adjusting a VGT turbine and a CVVL system to provide engine braking.

Next, FIG. 8 shows a third exemplary timing chart 800 for operating the cylinder in an engine braking mode. In particular, timing chart 800 shows operating the cylinder in a silent engine braking mode (e.g., sub-mode), wherein only pulling vacuum in the cylinder is used to generate braking torque. As such, compression release (and the corresponding noise) is avoided. Similar to timing chart 500 of FIG. 5, timing chart 600 of FIG. 6, and timing chart 700 of FIG. 7, timing chart 800 shows one cylinder cycle. Plots in FIG. 8 that correspond to the same parameters as described in FIG. 5 have the same reference numbers and will not be reintroduced. For example, the cylinder may be transitioned between operating in the combustion mode shown in FIG. 5 and the silent engine braking mode shown in FIG. 8 via adjustments to the CVVL system responsive to a braking event.

Similar to FIGS. 6 and 7, plot 502 of FIG. 8 does not experience any change in the engine braking mode as compared to the combustion mode shown in timing chart 500 of FIG. 5, and the intake valve remains in a closed position during all four strokes of the cylinder cycle while operating the cylinder and the CVVL system in the silent engine braking mode (plot 508). Additionally, the exhaust valve may be in an open position at different times while operating in the silent engine braking mode than while operating in the combustion mode shown in FIG. 5, operating in the compression engine braking mode shown in FIG. 6, and while operating in the dual cycle engine braking mode shown in FIG. 7. In the example shown by dashed plot 510 in FIG. 8, the exhaust valve begins to open at BDC and remains open until TDC and has a similar open duration as those shown in FIGS. 5 and 6 (e.g., for approximately 180 CAD).

For example, during the (traditional) power stroke, the exhaust valve remains closed as the piston moves toward BDC, resulting engine braking due to vacuum forming within the cylinder that resists the downward movement of the piston. The exhaust valve is opened at approximately BDC (dashed plot 510) to allow high pressure exhaust gas (e.g., pressurized by closing the VGT) to enter the evacuated cylinder. However, the exhaust valve remains open throughout the exhaust stroke until approximately TDC, enabling the upward movement of the piston to push out the exhaust gas without compressing the exhaust gas within the cylinder. The process then repeats, again forming vacuum within the cylinder during the (traditional) intake stroke while the exhaust valve and the intake valve are held closed (dashed plot 510 and plot 508, respectively) and pulling in and pushing out exhaust gas during the (traditional) intake stroke via the open exhaust valve.

Similar to timing chart 600 of FIG. 6, post-injection of fuel is not performed (plot 512) because the intake valve is held fully closed (plot 508). As such, air is not pumped to the emission control device via the cylinder.

In this way, by holding the intake valve closed and adjusting the exhaust valve opening and closing timings via the CVVL system, negative braking torque may be produced to slow the engine and a vehicle speed. Note that the valve opening timings, closing timings, and lift amounts shown in FIGS. 6-8 are exemplary, and other intake and exhaust valve opening timings, closing timings, and lift amounts that facilitate engine braking may be used without parting from the scope of this disclosure. As one example, the intake valve may be operated with non-zero lift to provide reduced braking torque. As another example, the exhaust valve may undergo one valve opening event during the cylinder cycle to provide reduced braking torque.

Next, FIG. 9 shows an example timeline 900 of using a CVVL system and a VGT to perform engine braking in a vehicle. For example, the CVVL system may be CVVL system 300 of FIG. 3, and the VGT may include VGT mechanism 200 shown in FIG. 2. The engine and the vehicle may be engine 10 and vehicle 5, respectively, of FIG. 1. An accelerator pedal position is shown in a plot 902, a vehicle speed is shown in a plot 904, a CVVL system mode is shown in a plot 906, engine fueling is shown in a plot 908, and a VGT vane position is shown in a plot 910.

For all of the above, the horizontal axis represents time, with time increasing along the horizontal axis from left to right. The vertical axis of each plot represents the corresponding labeled parameter. For plots 902 and 904, the labeled parameter increases along the vertical axis from bottom to top. For plot 902, a positive accelerator pedal position corresponds to a pedal (e.g. accelerator pedal 132 shown in FIG. 1) being depressed. When the accelerator pedal position is at zero, the pedal is in a neutral position. For plot 906, the CVVL system is shown either in a combustion mode or a braking mode, as labeled. An example of intake and exhaust valve operation in the combustion mode is shown in FIG. 5, while examples of intake and exhaust valve operation in the braking mode are shown in FIGS. 6-8. The braking mode may correspond to any of the engine braking modes described with respect to FIGS. 6-8, such as the compression engine braking mode, the dual cycle engine braking mode, and the silent engine braking mode. Further, the system may be adjusted between the different engine braking modes according to a braking demand, for example. For plot 908, the vertical axis shows whether the engine fueling is on (e.g., fuel is delivered to at least one cylinder of the engine) or off (e.g., fuel is not delivered to any cylinder of the engine), as labeled. For plot 910, the VGT vane position is shown ranging from a fully open position (e.g., "open") to a fully closed position (e.g., "closed"), as labeled. As described above with respect to FIG. 2, flow through a turbine of the VGT is further restricted as the VGT vanes are further closed.

From time t0 to time t1, the accelerator pedal position is kept constant (plot 902) indicating a constant driver-demanded torque to operate the vehicle at a consistent, non-zero vehicle speed (plot 904). During this time, since there is no request for braking, the CVVL system is operated in the combustion mode (plot 906). As such, the intake and exhaust valves of each cylinder of the engine open and close throughout a cylinder cycle, as described above with respect to FIGS. 4 and 5. For example, the intake valve may be open during the intake stroke, while the exhaust valve may be open during the exhaust stroke, as shown in FIG. 5. Further, engine fueling (plot 908) is on in order to provide fuel to each cylinder for combustion. Additionally, from time t0 to time t1, the VGT vanes are in a partially open position (plot 910) in order to meet the driver-demanded torque After time t1, a tip-out event occurs, where the accelerator pedal position (plot 902) changes from a depressed position to an undepressed, neutral position. As a result of the tip-out and the decreased driver-demanded torque, engine braking is desired. In response, at time t2, the CVVL system is transitioned to the braking mode and the VGT vanes are adjusted to a fully closed position (plot 910). For example, in the braking mode, the CVVL system maintains the intake valve of each cylinder closed while briefly opening the exhaust valve of each cylinder before TDC and BDC, such as illustrated in FIG. 7. Further, at time t2, engine fueling is turned off (plot 908) so that combustion is discontinued within the engine. With the VGT vanes in the fully closed position, an effective flow area of the VGT turbine is reduced, which restricts flow is through the VGT turbine. As a result, the exhaust gas pressurized in the exhaust manifold. While in operating in braking mode, vacuum and compression alternate within the cylinder to create a braking torque, thus slowing the engine and the vehicle (plot 904). In the example shown in FIG. 9, the vehicle speed decreases more quickly due to the combination of increased engine pumping losses due to the backpressure created by fully closing the VGT vanes and increased cylinder pumping losses due to operating the CVVL system in the braking mode compared to if only exhaust backpressure were used and without engaging mechanical brakes.

From time t2 to time t3, the CVVL system (plot 906) remains in the braking mode. The engine fueling (plot 908) remains off, and no fuel is injected into the cylinders. The VGT vane position (plot 910) remains closed, restricting air flow in the VGT. Thus, engine braking is performed between time t2 and time t3.

At time t3, the accelerator pedal position starts to increase (plot 902) as the vehicle operator depresses the pedal, indicating a request for driver-demanded torque. In response to the driver-demanded torque, the CVVL system (plot 906) is transitioned from the braking mode to the combustion mode, allowing the intake valve of each cylinder to open during the intake stroke along with adjusting an opening and closing timing of the exhaust valve of each cylinder. Further, in response to the increased pedal position at time t3, the engine fueling (plot 908) is resumed so that the fuel injector of each cylinder injects fuel into the corresponding cylinder. Further, the VGT vane position is adjusted from the closed position to a partially open position (plot 910). With the VGT vanes further open, exhaust gas more readily flows through the VGT, decreasing the pressure in the exhaust manifold. As a result of maintaining combustion, the vehicle speed (plot 904) increases in accordance with the driver-demanded torque, as indicated by the accelerator pedal position (plot 902). Between time t3 and time t4, the VGT vanes are further adjusted responsive to changes in the driver-demanded torque.

At time t4, the accelerator pedal position (plot 902) begins to decrease, indicating a second tip-out event, and plateaus in a non-neutral position. In response to the decrease in the demanded torque, engine braking is again requested at time t5. To perform the engine braking, the CVVL system (plot 906) is transitioned from the combustion mode to the braking mode, the engine fueling (plot 908) is discontinued, and the VGT vane position (plot 910) is decreased in openness until it is in the fully closed position. Since the decrease in demanded torque from time t4 to time t5 is less than that shown from time t1 to time t2, the CVVL system may adjust the intake valve and/or exhaust valve of each cylinder differently from time t4 to time t5 than what was described from time t1 to time t2. For example, the intake valve may open slightly to allow some exhaust gas to flow into the intake manifold, causing the engine braking to decrease in speed. With engine braking enacted, the vehicle speed (plot 904) decreases.

At time t6, a torque output of the engine equals the driver-demanded torque, and thus, engine braking is no longer requested. In response, at time t6, the CVVL system (plot 906) is transitioned from the braking mode to the combustion mode, the engine fueling (plot 908) is resumed, fueling the engine's cylinders, and the VGT vane position (plot 910) is adjusted to a partially open position.

Timeline 900 is exemplary, and other examples are possible without parting from the scope of this disclosure. For example, as described above with respect to FIG. 4, engine fueling (plot 908) may not be discontinued to all cylinders. Further, there may be examples where fuel post-injection is used during engine braking to rebalance an emission control device or to generate heat for a regeneration event. As another example, within the CVVL system braking mode (plot 906), the intake valve may not remain fully closed throughout each engine cycle. The intake valve may open with reduced lift and/or for a short duration to allow exhaust gas into the intake manifold to slow down the braking process or to meet a lower braking demand, for example.

In this way, a CVVL system and a VGT may be used in combination to increase engine pumping losses and slow a vehicle without or in combination with engaging friction brakes. By increasing a portion of overall vehicle braking provided via engine braking, a life of the friction brakes may be extended by decreasing degradation of the friction brakes. Further, by utilizing the CVVL system in combination with the VGT, a noise level produced through the engine braking may be reduced compared with traditional decompression braking.

The technical effect of combining VGT adjustments that increase exhaust backpressure with CVVL adjustments that increase in-cylinder pumping losses during an engine braking event is that a braking torque is increased while a noise produced via the engine braking is decreased.

As one example, a method comprises: responsive to an engine braking request: deactivating fueling to at least one cylinder of an engine, decreasing an effective flow area of a turbine inlet of a variable geometry turbocharger (VGT), and adjusting an intake valve of the at least one cylinder based on a requested braking torque of the engine braking request and the effective flow area of the turbine inlet. In a first example of the method, adjusting the intake valve of the at least one cylinder based on the requested braking torque of the engine braking request and the effective flow area of the turbine inlet comprises further closing the intake valve of the at least one cylinder as the requested braking torque of the engine braking request increases. In a second example of the method, optionally including the first example, further closing the intake valve comprises decreasing a hydraulic pressure in a continuously variable valve lift mechanism hydraulically coupled to the intake valve. In a third example of the method, optionally including one or both of the first and second examples, adjusting the intake valve of the at least one cylinder based on the requested braking torque of the engine braking request and the effective flow area of the turbine inlet comprises: determining an amount of braking torque generated by decreasing the effective flow area of the turbine inlet, and further closing the intake valve as a difference between the determined amount of braking torque generated by decreasing the effective flow area of the turbine inlet and the requested braking torque of the engine braking request increases. In a fourth example of the method, optionally including any or all of the first through third examples, the method further comprises: adjusting an exhaust valve of the at least one cylinder. In a fifth example of the method, optionally including any or all of the first through fourth examples, adjusting the exhaust valve of the at least one cylinder comprises adjusting an opening timing of the exhaust valve. In a sixth example of the method, optionally including any or all of the first through fifth examples, adjusting the opening timing of the exhaust valve comprises adjusting the opening timing to be within a threshold number of crank angle degrees before top dead center in one or both of an exhaust stroke and a compression stroke of the at least one cylinder. In a seventh example of the method, optionally including any or all of the first through sixth examples, adjusting the opening timing of the exhaust valve comprises differently adjusting a hydraulic pressure in a continuously variable valve lift mechanism hydraulically coupled to the exhaust valve than when the at least one cylinder is fueled.

As another example, a method comprises: during an engine braking event in an engine: discontinuing combustion in the engine, generating a first portion of a requested braking torque of the engine braking event by decreasing a cross-sectional area of an inlet of an exhaust turbine, and generating a second portion the requested braking torque by closing intake valves of the engine by an amount determined based on the requested braking torque and the first portion. In a first example of the method, the method further comprises: generating a third portion of the requested braking torque by closing a throttle valve positioned in an intake of the engine, and wherein the amount for closing the intake valves is further determined based on the third portion. In a second example of the method, optionally including the first example, generating the second portion of the requested braking torque further includes performing decompression braking. In a third example of the method, optionally including one or both of the first and second examples, performing the decompression braking comprises opening exhaust valves of the engine via a continuously variable valve lift system as a piston within a corresponding cylinder rises toward top dead center. In a fourth example of the method, optionally including any or all of the first through third examples, opening the exhaust valves of the engine as the piston within the corresponding cylinder rises toward top dead center occurs during one or both of an exhaust stroke of the corresponding cylinder and a compression stroke of the corresponding cylinder. In a fifth example of the method, optionally including any or all of the first through fourth examples, discontinuing combustion in the engine includes not injecting fuel into an engine cylinder during a compression stroke of the engine cylinder. In a sixth example of the method, optionally including any or all of the first through fifth examples, the method further comprises: performing a post-injection of fuel in at least one cylinder of the engine during the engine braking event. In a seventh example of the method, optionally including any or all of the first through sixth examples, performing the post-injection of fuel in the at least one cylinder of the engine comprises injecting an amount of fuel into the at least one cylinder during one of a power stroke and an exhaust stroke of the at least one cylinder, and wherein the amount of fuel is less than used for combustion.

As another example, a system comprises: an engine including a plurality of cylinders, each of the plurality of cylinders including an intake valve and an exhaust valve each controlled via a continuously variable valve lift (CVVL) system, a variable geometry turbocharger (VGT) including a turbine coupled to an exhaust passage of the engine, and a controller including instructions stored in non-transitory memory that, when executed, cause the controller to: provide engine braking by adjusting an inlet geometry of the turbine to a further closed position, discontinuing combustion in a number of the plurality of cylinders, and adjusting one or both of the intake valve and the exhaust valve of each of the number of the plurality of cylinders via the CVVL system. In a first example of the system, the controller includes further instructions stored in non-transitory memory that, when executed, cause the controller to: determine the number of the plurality of cylinders based on a requested braking torque for the engine braking, with the number increasing as the requested braking torque increases. In a second example of the system, optionally including the first example, the controller includes further instructions stored in non-transitory memory that, when executed, cause the controller to: determine the further closed position of the inlet geometry of the turbine based on the requested braking torque, with a degree of closing of the further closed position increasing as the requested braking torque increases. In a third example of the system, optionally including one or both of the first and second examples, to adjust one or both of the intake valve and the exhaust valve of each of the number of the plurality of cylinders via the CVVL system, the controller includes further instructions stored in non-transitory memory that, when executed, cause the controller to: determine a difference between an amount of braking torque provided by adjusting the inlet geometry of the turbine to the further closed position and the requested braking torque for the engine braking, close the intake valve by a closing amount that increases as the difference increases until the intake valve is maintained fully closed throughout an engine cycle, and open the exhaust valve for a threshold number of crank angle degrees prior to bottom dead center during a power stroke and an intake stroke and for the threshold number of crank angle degrees prior to top dead center during an exhaust stroke and a compression stroke.

In another representation, a method comprises: responsive to an engine braking request: deactivating fueling to at least one cylinder of an engine; decreasing an effective flow area of a turbine inlet of a variable geometry turbocharger (VGT); fully closing an intake valve of the at least one cylinder; and adjusting an exhaust valve of the at least one cylinder based on a requested braking torque of the engine braking request. In the previous example, additionally or optionally, adjusting the exhaust valve of the at least one cylinder based on the requested braking torque of the engine braking request comprises opening the exhaust valve a threshold number of crank angle degrees before top dead center. In one or both of the previous examples, additionally or optionally, the threshold number of crank angle degrees increases as the requested braking torque decreases. In any or all of the previous examples, additionally or optionally, opening the exhaust valve the threshold number of crank angle degrees before top dead center comprises opening the exhaust valve the threshold number of crank angle degrees before top dead center of an exhaust stroke of the at least one cylinder. In any or all of the previous examples, additionally or optionally, opening the exhaust valve the threshold number of crank angle degrees before top dead center comprises opening the exhaust valve the threshold number of crank angle degrees before top dead center of a compression stroke of the at least one cylinder. In any or all of the previous examples, the method additionally optionally further comprises closing the exhaust valve at top dead center. In any or all of the previous examples, the method additionally optionally further comprises opening the exhaust valve the threshold number of crank angle degrees before bottom dead center. In any or all of the previous examples, additionally or optionally, opening the exhaust valve the threshold number of crank angle degrees before bottom dead center comprises opening the exhaust valve the threshold number of crank angle degrees before bottom dead center of an intake stroke of the at least one cylinder. In any or all of the previous examples, additionally or optionally, opening the exhaust valve the threshold number of crank angle degrees before bottom dead center comprises opening the exhaust valve the threshold number of crank angle degrees before bottom dead center of a power stroke of the at least one cylinder. In any or all of the previous examples, the method additionally optionally further comprises closing the exhaust valve at bottom dead center. In any or all of the previous examples, additionally or optionally, adjusting the exhaust valve of the at least one cylinder based on the requested braking torque of the engine braking request comprises opening the exhaust valve during one or both of an exhaust stroke and a compression stroke while maintaining the exhaust valve closed during each of the intake stroke and the power stroke.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to an engine braking request:
deactivating fueling to at least one cylinder of an engine;
decreasing an effective flow area of a turbine inlet of a variable geometry turbocharger (VGT); and
adjusting an intake valve of the at least one cylinder based on a requested braking torque of the engine braking request and the effective flow area of the turbine inlet, including determining an amount of braking torque generated by decreasing the effective flow area of the turbine inlet, and further closing the intake valve as a difference between the determined amount of braking torque generated by decreasing the effective flow area of the turbine inlet and the requested braking torque of the engine braking request increases.

2. The method of claim 1, wherein adjusting the intake valve of the at least one cylinder based on the requested braking torque of the engine braking request and the effective flow area of the turbine inlet comprises further closing the intake valve of the at least one cylinder as the requested braking torque of the engine braking request increases.

3. The method of claim 2, wherein further closing the intake valve comprises decreasing a hydraulic pressure in a continuously variable valve lift mechanism hydraulically coupled to the intake valve.

4. The method of claim 1, further comprising adjusting an exhaust valve of the at least one cylinder.

5. The method of claim 4, wherein adjusting the exhaust valve of the at least one cylinder comprises adjusting an opening timing of the exhaust valve.

6. The method of claim 5, wherein adjusting the opening timing of the exhaust valve comprises adjusting the opening timing to be within a threshold number of crank angle degrees before top dead center in one or both of an exhaust stroke and a compression stroke of the at least one cylinder.

7. The method of claim 5, wherein adjusting the opening timing of the exhaust valve comprises differently adjusting a hydraulic pressure in a continuously variable valve lift mechanism hydraulically coupled to the exhaust valve than when the at least one cylinder is fueled.

8. A method, comprising:
during an engine braking event in an engine:
discontinuing combustion in the engine;
generating a first portion of a requested braking torque of the engine braking event by decreasing a cross-sectional area of an inlet of an exhaust turbine; and
generating a second portion the requested braking torque by closing intake valves of the engine by an amount determined based on the requested braking torque and the first portion, including fully closing the intake valves throughout an engine cycle responsive to the requested brake torque being greater than a non-zero, brake threshold above which maximum engine braking is desired.

9. The method of claim 8, further comprising, generating a third portion of the requested braking torque by closing a throttle valve positioned in an intake of the engine, and wherein the amount for closing the intake valves is further determined based on the third portion.

10. The method of claim 8, wherein generating the second portion of the requested braking torque further includes performing decompression braking, the method further including adjusting exhaust valve operation responsive to the requested brake torque, including opening the exhaust valve for a threshold number of crank angle degrees prior to bottom dead center during a power stroke and an intake stroke and for the threshold number of crank angle degrees prior to top dead center during an exhaust stroke and a compression stroke.

11. The method of claim 10, wherein performing the decompression braking comprises opening exhaust valves of the engine via a continuously variable valve lift system as a piston within a corresponding cylinder rises toward top dead center.

12. The method of claim 11, wherein opening the exhaust valves of the engine as the piston within the corresponding cylinder rises toward top dead center occurs during one or both of an exhaust stroke of the corresponding cylinder and a compression stroke of the corresponding cylinder.

13. The method of claim 8, wherein discontinuing combustion in the engine includes not injecting fuel into an engine cylinder during a compression stroke of the engine cylinder.

14. The method of claim 8, further comprising performing a post-injection of fuel in at least one cylinder of the engine during the engine braking event.

15. The method of claim 14, wherein performing the post-injection of fuel in the at least one cylinder of the engine comprises injecting an amount of fuel into the at least one cylinder during one of a power stroke and an exhaust stroke of the at least one cylinder, and wherein the amount of fuel is less than used for combustion.

16. A system, comprising:
   an engine including a plurality of cylinders, each of the plurality of cylinders including an intake valve and an exhaust valve each controlled via a continuously variable valve lift (CVVL) system;
   a variable geometry turbocharger (VGT) including a turbine coupled to an exhaust passage of the engine; and
   a controller including instructions stored in non-transitory memory that, when executed, cause the controller to:
      provide engine braking by adjusting an inlet geometry of the turbine to a further closed position, discontinuing combustion in a number of the plurality of cylinders, and adjusting both of the intake valve and the exhaust valve of each of the number of the plurality of cylinders via the CVVL system in response to a requested braking torque for the engine braking, including in response to additional noise reduction being desired, holding the exhaust valves open while the piston travels from bottom dead center to top dead center and otherwise holding the exhaust valve closed.

17. The system of claim 16, wherein the controller includes further instructions stored in non-transitory memory that, when executed, cause the controller to:
   determine the number of the plurality of cylinders based on the requested braking torque for the engine braking, with the number increasing as the requested braking torque increases.

18. The system of claim 17, wherein the controller includes further instructions stored in non-transitory memory that, when executed, cause the controller to:
   determine the further closed position of the inlet geometry of the turbine based on the requested braking torque, with a degree of closing of the further closed position increasing as the requested braking torque increases.

19. The system of claim 18, wherein to adjust one or both of the intake valve and the exhaust valve of each of the number of the plurality of cylinders via the CVVL system, the controller includes further instructions stored in non-transitory memory that, when executed, cause the controller to:
   determine a difference between an amount of braking torque provided by adjusting the inlet geometry of the turbine to the further closed position and the requested braking torque for the engine braking;
   close the intake valve by a closing amount that increases as the difference increases until the intake valve is maintained fully closed throughout an engine cycle; and
   open the exhaust valve for a threshold number of crank angle degrees prior to bottom dead center during a power stroke and an intake stroke and for the threshold number of crank angle degrees prior to top dead center during an exhaust stroke and a compression stroke.

* * * * *